(12) United States Patent
Ré

(10) Patent No.: US 8,381,761 B2
(45) Date of Patent: Feb. 26, 2013

(54) PRESSURE MANAGEMENT CONTROL VALVE ASSEMBLY

(75) Inventor: Daniel Ré, Les Agettes (CH)

(73) Assignee: CLA-VAL Co., Costa Mesa, CA (US)

( * ) Notice: Subject to any disclaimer, the term of this patent is extended or adjusted under 35 U.S.C. 154(b) by 350 days.

(21) Appl. No.: 12/782,236

(22) Filed: May 18, 2010

(65) Prior Publication Data

US 2010/0294970 A1    Nov. 25, 2010

Related U.S. Application Data

(60) Provisional application No. 61/180,200, filed on May 21, 2009.

(51) Int. Cl.
*F16K 31/12* (2006.01)
(52) U.S. Cl. ......... 137/489.5; 251/29; 251/35; 251/285; 137/492.5; 137/625.61
(58) Field of Classification Search .......... 251/29, 251/35, 284, 285; 137/488, 489, 489.5, 492, 137/492.5, 625.61
See application file for complete search history.

(56) References Cited

U.S. PATENT DOCUMENTS

| | | | |
|---|---|---|---|
| 5,967,176 A | 10/1999 | Blann et al. | |
| 6,019,121 A * | 2/2000 | Uehara | 137/116.5 |
| 6,595,237 B2 * | 7/2003 | Cecchinato et al. | 137/489.5 |
| 6,935,362 B1 | 8/2005 | Yonnet | |
| 6,971,625 B2 * | 12/2005 | Szymaszek et al. | 251/28 |
| 2008/0251146 A1 * | 10/2008 | Folk | 137/624.27 |
| 2009/0288718 A1 * | 11/2009 | Jablonski | 137/486 |

FOREIGN PATENT DOCUMENTS

| | | |
|---|---|---|
| DE | 1237436 B | 3/1967 |
| DE | 1943551 A1 | 4/1971 |
| DE | 4212659 A1 | 10/1993 |
| EP | 610703 A2 * | 8/1994 |
| WO | 2008/127899 A2 | 10/2008 |

OTHER PUBLICATIONS

Machine Translation of EP 610703 A2 (from EPO website on Sep. 5, 2012).*

* cited by examiner

*Primary Examiner* — Craig Schneider
*Assistant Examiner* — Jessica Cahill
(74) *Attorney, Agent, or Firm* — Kelly & Kelley, LLP

(57) ABSTRACT

An adjustable hydraulically operated pressure management control pilot assembly has first and second diaphragm assemblies which define two fluid pressure chambers. Varying the pressure between these two fluid chambers modulates the control pilot assembly between adjusted low and high set points, which can be used to control high and low pressures downstream of a pressure reducing valve of a water supply system.

60 Claims, 14 Drawing Sheets

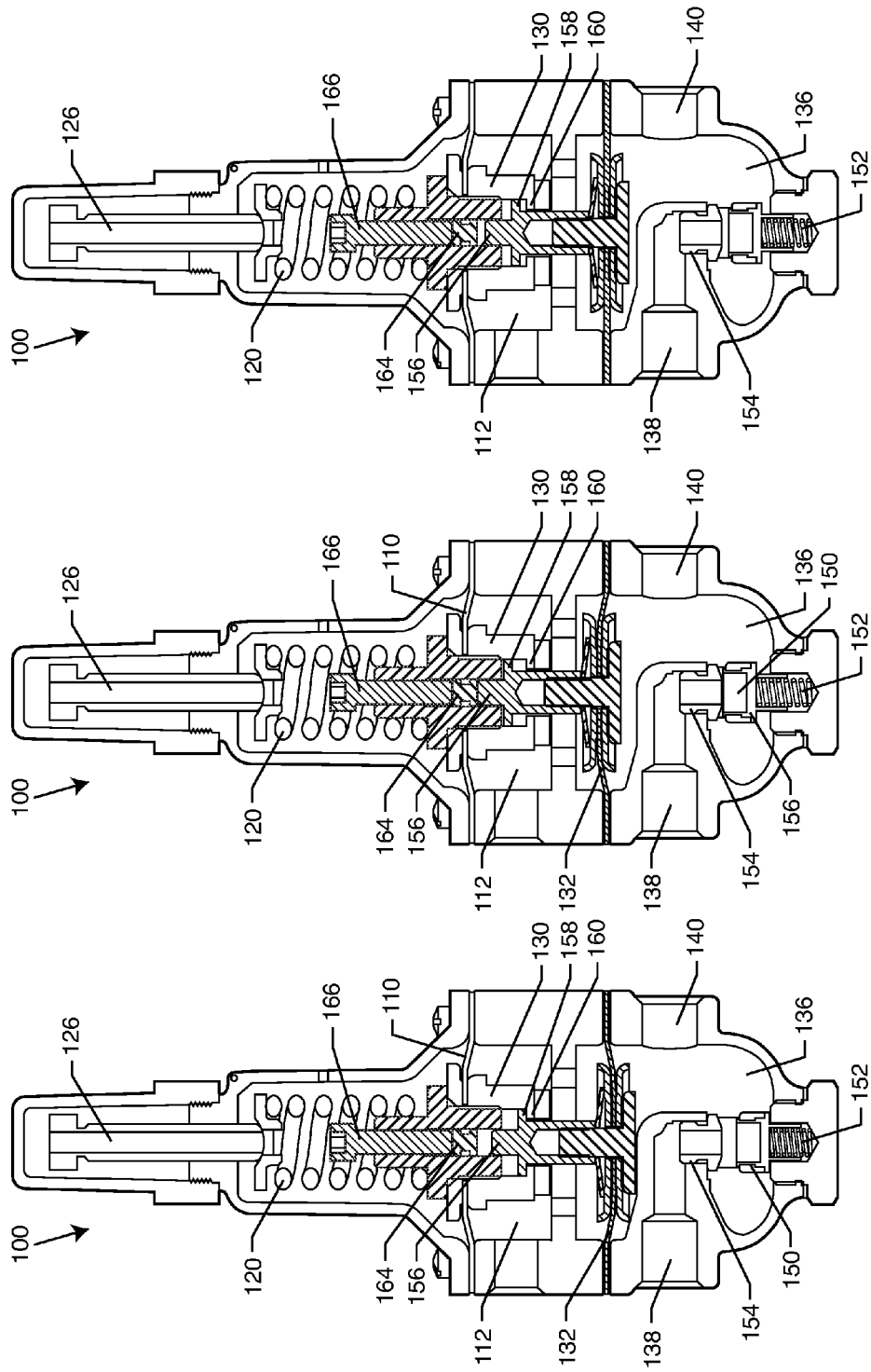

PRESSURE MANAGEMENT CONTROL VALVE ASSEMBLY

BACKGROUND OF THE INVENTION

The present invention generally relates to control pilots and pressure management systems, such as those employed on municipal water utility systems. More particularly, the present invention relates to an adjustable hydraulically operated pilot assembly to manage system pressure conditions.

The supply and pressure control of water mains and municipal water utility systems and the adequacy of the supply and supply infrastructure vary from place to place. Conventionally, the water system is arranged so that a minimum water pressure is maintained at all points in the system. This is usually done with reference to the pressure prevailing at a number of critical points, including those which are highest above sea level or farthest away from the source of supply in the water district. However, there is invariably considerable fluctuation in the demand for water throughout the day and also a considerable seasonal variation so that the maximum pressure is generally higher than the necessary minimum value.

There is a general understanding throughout the worldwide water supply industry that instances of water loss are common in many water distribution networks and in many instances the level of water loss can be relatively high. The amount of water loss in the system is due to a variety of leak sources, such as improperly tightened pipe flange connections, leaking flange gaskets, leaking valve seals, failed seals, old pipes (with pinhole bursts), loose fittings, leaky faucets, etc. The sum of these sources of leakage can add up to a substantial amount of water loss. Maintaining the entry point pressure at all times at the level necessary to provide adequate pressure at the distant points for periods of high demand can result, during periods of low demand, an excessive pressure at the consumer's premises, and thus increased waste of water by unnecessary consumption and leakage. The volume of water lost through leakage is directly related to pressure in the system.

Automatic pressure reducing valves are used in water distribution systems to reduce pressure to a pre-determined value or sub-point that is adequate, but does not expose normal components, such as household hot water tanks, to overpressure. The sub-point is typically determined to provide minimum pressure that meets criteria of the water utility, particularly under maximum or "peak" demand conditions which can occur when a fire is being fought. The pressure required for peak demand is usually significantly higher than that required for "off-peak" or typical nighttime conditions. Under low demand conditions, not only does leakage form a higher proportion of the total demand, but investigation has implied that some leak orifices can actually increase in area with pressure, aggravating the problem if excessive pressures are maintained at all times.

Thus, in the waterworks industry, there is a desire to lower the system water pressure during low demand periods. From a practical point of view, lowering the water pressure in a system during a low demand period reduces the amount of water loss due to system leaks. Managing water pressure can also reduce the incidence of pipe breaks in aging water network infrastructures. A lower pressure means pipes are subject to lower stresses during low demand periods. Over time, the cumulative lower stresses to piping infrastructure helps to increase the life expectancy of the piping in the water distribution system.

Accordingly, there is a continuing need for an adjustable hydraulically operated pressure management control pilot assembly which can be used to set the water pressure high and low points so as to control the system water pressure between low demand periods and high demand periods. There is also a continuing need for an improved flow-driven valve system for automatically controlling downstream pressure between selected set points. The present invention fulfills these needs and provides other related advantages.

SUMMARY OF THE INVENTION

The present invention is directed to a pilot valve assembly that controls a pressure-reducing valve of a water supply system between high pressure and low pressure set points so as to control the system water pressure between low demand periods and high demand periods.

The pilot valve assembly of the present invention generally comprises a body defining an interior cavity. A first diaphragm assembly within the cavity includes a first diaphragm having a first surface thereof at least partially defining a first fluid pressure chamber in fluid communication with a fluid passageway formed in the body. The first diaphragm assembly also includes a first biasing means for biasing the first diaphragm. A second diaphragm assembly is within the cavity and includes a second diaphragm having a first surface thereof at least partially defining the first fluid pressure chamber, and a second surface thereof at least partially defining a second fluid pressure chamber. The second fluid pressure chamber is in fluid communication with a fluid inlet and a fluid outlet formed in the body. A gate is disposed between the fluid inlet and the fluid outlet for controlling fluid flow through the second fluid pressure chamber. A second biasing means biases the gate and the second diaphragm. The fluid pressure at the outlet of the second chamber is substantially equal to the pressure at the outlet of the pressure reducing valve.

The assembly includes means for selectively adjusting the first biasing means to adjust a high pressure set point. Typically, the first biasing means comprises a spring, and the adjusting means comprises a first adjustment screw coupled to the spring. The second biasing means of the assembly typically comprises a spring which biases the gate towards a closed position.

In a particularly preferred embodiment, the ratio of the area of the first and second diaphragms is approximately 1:1. The second diaphragm assembly includes a stem which extends into the first diaphragm assembly and slidably travels with respect thereto as the first diaphragm assembly and the second diaphragm assembly move relative to one another. The first diaphragm assembly includes first and second stops for limiting travel of the stem. The first and second stops move as the first diaphragm is moved. Means, in the form of a second adjustment screw, is used for adjusting the first stop to adjust a low pressure set point.

When a fluid pressure in the first fluid pressure chamber is equal to or less than a low pressure set point, the gate is moved towards a closed position to restrict the flow of fluid through the second chamber. When the fluid pressure in the first fluid pressure chamber is equal to or greater than a high pressure set point, the gate is moved towards an open position to facilitate flow of fluid through the second chamber.

In one embodiment, the first and second fluid pressure chambers of the pilot valve assembly are isolated from fluid communication with one another. In another embodiment, a fluid passageway is formed therebetween, which is opened or closed depending on the relative positions of the first and second diaphragm assemblies.

The second fluid pressure chamber is fluidly coupled to a valve actuating pressure chamber of the pressure reducing valve. A fixed orifice is disposed between the inlet of the second fluid pressure chamber and the inlet of the pressure reducing valve.

In one embodiment, at least one electronically controlled valve is fluidly coupled to the first fluid pressure control chamber for adjusting fluid pressure in the first fluid pressure chamber. Typically, the at least one electronically controlled valve comprises a first electronically controlled valve which is fluidly coupled to the inlet of the pressure reducing valve and the first fluid pressure control chamber. A second electronically controlled valve is fluidly coupled to the outlet of the pressure reducing valve and the first fluid pressure control chamber. An electronic controller is used to control the first and second electronically controlled valves.

In another embodiment, a variable orifice assembly is operably connected to the pressure reducing valve. The variable orifice assembly has a variable fluid flow between an inlet thereof which is fluidly coupled to the first fluid pressure chamber, and an outlet thereof which is fluidly coupled to the outlet of the pressure reducing valve. A variable orifice fluid flow stem of the variable orifice assembly is coupled to the valve of the pressure reducing valve and disposed between the fluid inlet and the fluid outlet at the variable orifice assembly. Fluid flow through the variable orifice assembly varies as the valve of the pressure reducing valve is opened and closed.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is a sectional diagrammatic view illustrating the control pilot in a high flow state;

FIG. 4 is a sectional diagrammatic view of the control pilot in a low flow state;

FIG. 5 is a sectional diagrammatic view of the control pilot in a modulating flow state;

DETAILED DESCRIPTION OF THE PREFERRED EMBODIMENTS

As shown in the accompanying drawings, for purposes of illustration, the present invention relates to an adjustable hydraulically operated pressure management control pilot, generally referred to by the reference number 100. As will be discussed more fully herein, the control pilot 100 can be used in many applications, and is particularly adapted for managing pressure conditions in a waterworks system.

Figure 1:
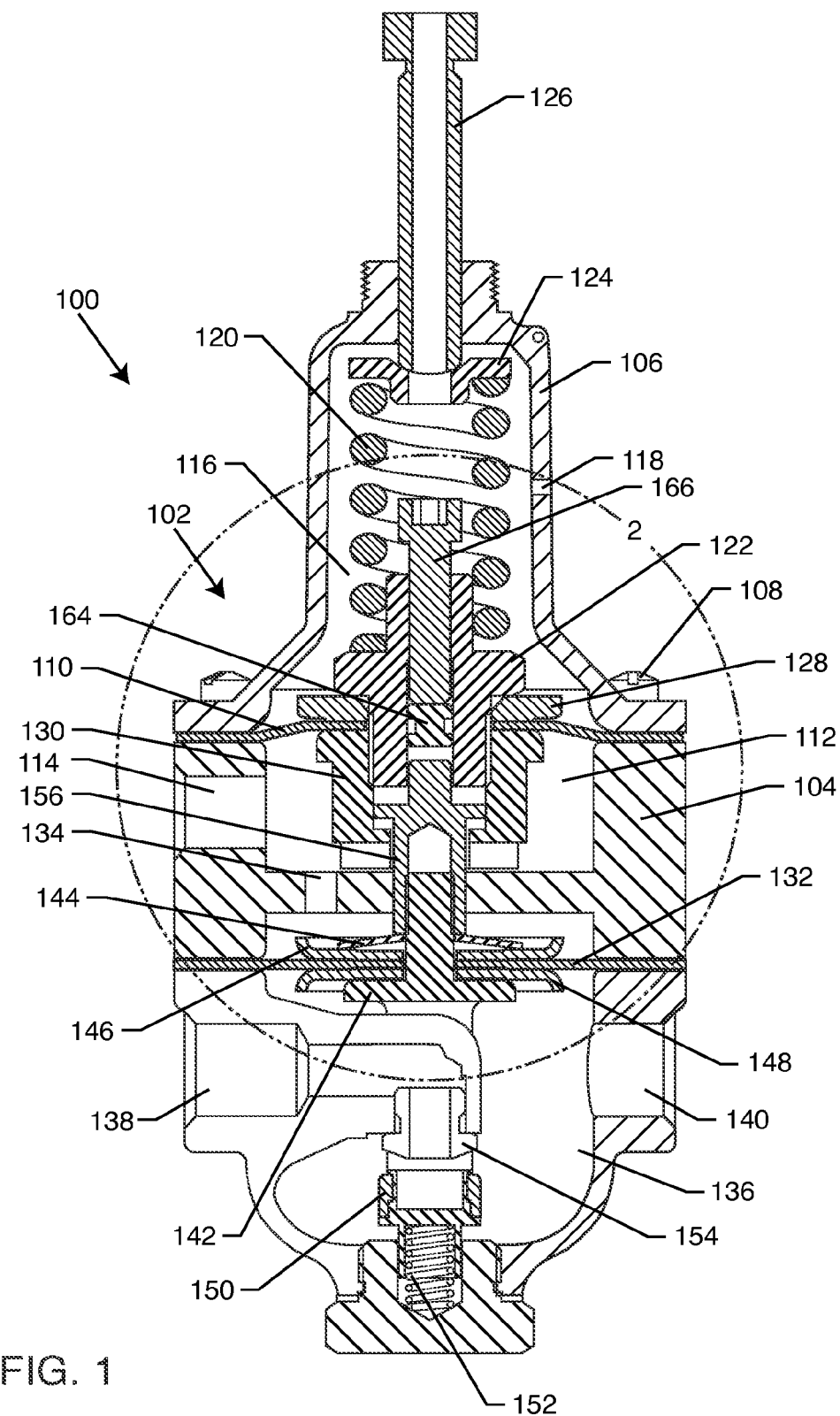
FIG. 1 is a cross-sectional view of the control pilot embodying the present invention.

With reference now to FIG. 1, a cross-sectional view of the control pilot 100 is shown. The control pilot 100 comprises a generally hollow body 102 which is typically comprised of a lower body 104 and a cover 106 attached to one another by means of fasteners 108 or the like.

Within an interior cavity of the body 102 are two diaphragm assemblies. The first diaphragm assembly includes a first diaphragm 110 having a first surface (illustrated in FIG. 1 as the lower surface) which at least partially defines a first fluid pressure chamber 112. The first fluid chamber 112 has a fluid passageway 114 which permits the ingress and egress of water. A generally opposite second surface of the first diaphragm 110 at least partially defines a chamber 116 which is open to the atmosphere, such as by means of passageway 118 formed in cover 106.

Means are provided for biasing the first diaphragm 110. More particularly, a first spring 120 is used to bias the first diaphragm 110. As illustrated, the spring 120 biases the diaphragm 110 downwardly. The spring 120 is disposed between a lower spring guide 122 and an upper spring guide 124. The bias of the spring 120 can be adjusted by turning a high pressure adjustment screw 126 which engages with the upper spring guide 124. The washer 128 is disposed between the lower spring guide 122 and the upper diaphragm 110. The first diaphragm assembly also includes a pressure positioned stem guide 130, as illustrated positioned on the first side of the first diaphragm 110. As the first diaphragm 110 is moved, the first spring 120 compresses or extends, the lower spring guide 122, the washer 128 and the stem guide 130 move as well.

With continuing reference to FIG. 1, the second diaphragm assembly includes a second diaphragm 132 having a first surface thereof at least partially defining the first fluid chamber 112 in cooperation with the first diaphragm 110. In a particularly preferred embodiment, the ratio of the area of the first diaphragm 110 to the area of the second diaphragm 132 is approximately 1:1. The embodiment illustrated in FIG. 1 shows a fluid passageway 134 within the body 102 for fluid communication between the first and second diaphragms 110 and 132. It will be understood that the first fluid pressure chamber 112 extends between the first and second diaphragms 110 and 132. A second, generally opposite, surface of the second diaphragm 132 at least partially defines a second fluid pressure chamber 136. As can be seen from the illustration, the first and second fluid chambers 112 and 136 are isolated from one another such that there is no fluid communication therebetween. The second fluid pressure chamber 136 is in fluid communication with a fluid inlet 138 and a fluid outlet 140.

A stem 142 and washers 144-148 are connected to the second diaphragm 132 and move in conjunction with the diaphragm 132. As the second diaphragm 132 is moved upwardly and downwardly, a gate is opened and closed. The gate is comprised of a disc retainer 150 which is biased by a spring 152 towards a seat 154. When the disc retainer 150 is moved away from the seat 154, such as when the pressure in the first fluid pressure chamber 112 is greater than the combined pressure and force of spring 152, causing the second or lower diaphragm 132 to move downwardly, and thus the stem 142 and the disc retainer 150 downwardly, the gate is opened and fluid is allowed to flow from inlet 138 to outlet 140 through the second or lower fluid pressure chamber 136. However, if the second diaphragm 132 is moved upward, such as by the combined water pressure in the second chamber 136 and bias or force of spring 152 being greater than the water pressure in pressure chamber 112, then the disc retainer 150 is moved towards or even into engagement with seat 154, thus closing off the passageway or gate between the fluid inlet 138 and outlet 140.

Figure 2:
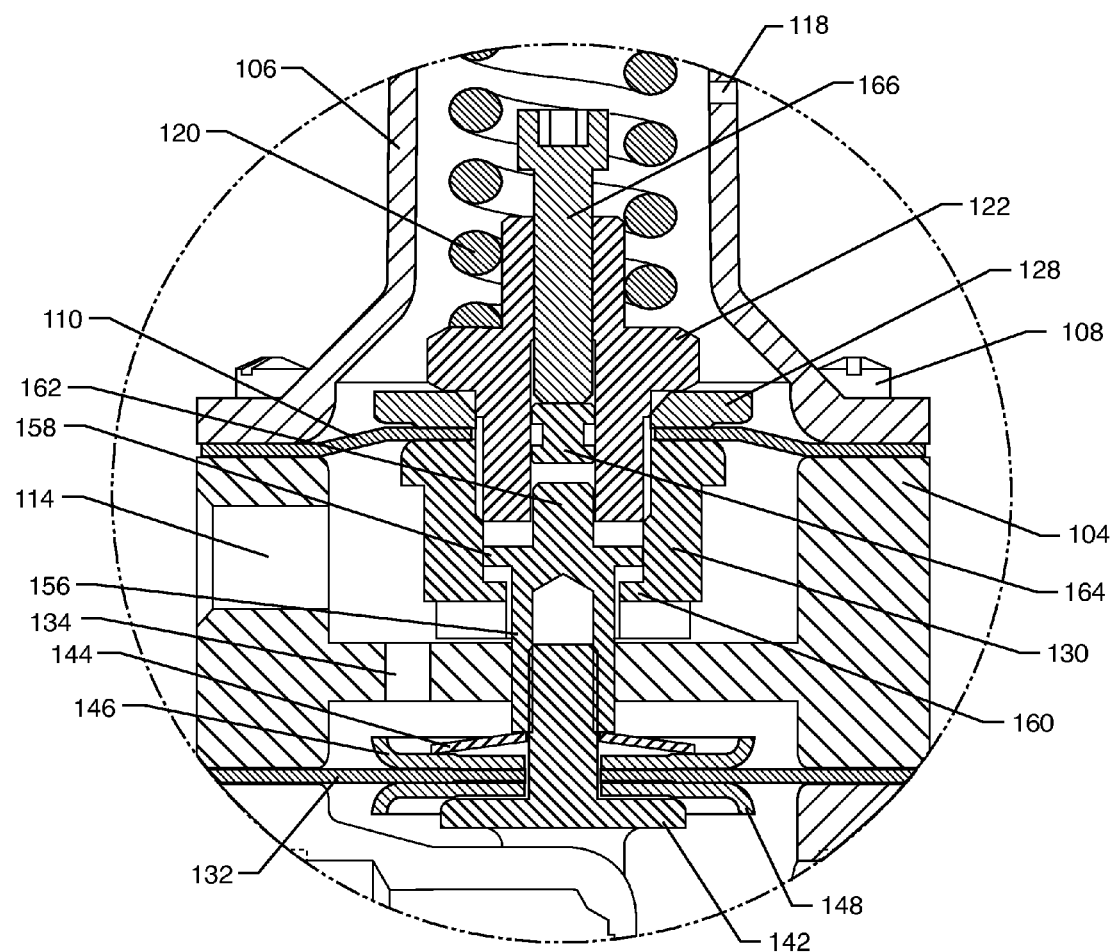
FIG. 2 is an enlarged sectional view of area "2" of FIG. 1.

With reference now to FIGS. 1 and 2, a pressure position stem 156 is connected to the second diaphragm 132 and moves upwardly and downwardly in conjunction with the movement of the diaphragm 132. As can be seen in FIGS. 1 and 2, this stem extends into the first diaphragm assembly, and more particularly slideably travels with respect to the stem guide 130 and lower spring guide 122. Thus, as the first or upper diaphragm 110 and the lower or second diaphragm 132 move, the pressure position stem 156 is moved with respect to the lower spring guide 122 and the stem guide 130. In FIG. 2, in particular, it can be seen that the pressure position stem 156 has a lip 158 which is engageable with a shoulder 160 of the stem guide 130. Thus, the shoulder 160 of the stem guide serves as a stop to limit the downward movement of the pressure position stem 156.

With continuing reference to FIGS. 1 and 2, an upper end 162 of the pressure position stem 156 is moveable into and out of the lower spring guide 122. A spacer 164, which serves as a stop, is also disposed within the lower spring guide 122 and is engageable with the upper end 162 of the pressure position stem 156 so as to limit its upward movement. The position of the spacer stop 164 is adjustable by means of a second adjustment screw 166 which is a low pressure adjustment screw.

The high pressure set point is adjusted by means of screw 126, which compresses or loosens spring 120. The low pressure set point is adjusted by means of screw 166, which raises or lowers spacer stop 164. Spacer stop 164 limits the travel of the pressure position stem 156, and thus the second or lower diaphragm assembly. Shoulder or stop 160 of the stem guide 130 also serves to limit the travel and movement of the pressure position stem 156, and thus the second or lower diaphragm assembly. Thus, the pressure position stem 156, and thus the second diaphragm assembly, is limited in upward and downward travel by the spacer stop 130 and the shoulder 160 of the first or upper diaphragm assembly. Of course, this limits the movement of the disc retainer 150, which is attached to the stem 142 of the second or lower diaphragm assembly so as to limit the opening and closing of the gate between the fluid inlet 138 and fluid outlet 140 of the second fluid pressure chamber 136.

When a fluid pressure in the first fluid chamber 112 is equal to or less than a low pressure set point, the gate is moved towards a closed position to restrict the flow of fluid through the second chamber 136. When the fluid pressure in the first fluid pressure chamber 112 is equal to or greater than a high pressure set point, the gate is moved towards an open position to facilitate flow of fluid through the second chamber 136. Fluid pressure at the outlet 140 of the second chamber 136 is substantially equal to outlet pressure of a pressure reducing valve, or the pressure downstream of the pressure reducing valve of a waterworks system such as illustrated in FIGS. 6-9. The control pilot 100 controls high and low pressures downstream of a pressure reducing valve, sometimes referred to herein as a main valve, by varying the pressure in the first pressure chamber 112 of the control pilot 100. Varying the fluid pressure in the first pressure chamber 112 causes the pressure in the second pressure chamber 136 to modulate between low and high set points of the control pilot 100.

With reference now to FIG. 3, during normal to high flow demand conditions, pressure in the first and second chambers 112 and 136 act on the second or lower diaphragm 132 to bias the disc retainer portion of the gate 150 to an open position, as illustrated. In such a condition the lip 158 of the pressure position stem 156 is engaged with the shoulder or stop 160 of the stem guide, which limits the travel of the pressure position stem 156. When the pressure position stem 156 and pressure position stem guide 130 are in contact, as illustrated in FIG. 3, the position of the pressure management control pilot 100 is regulating at the high pressure set point. The high pressure set point is determined by the adjusted load of the high pressure spring 120, which can be adjusted by means of adjustment screw 126. The lip 158 position is determined by the balance of forces between the high pressure spring 120 and the pressure acting on the surface of the upper diaphragm 110. As long as the fluid pressure in the first chamber 112 is greater than the pressure in the second chamber 136, the pressure position stem 156 is in contact with the pressure position stem guide 130, and thus there is a gap between the pressure position stem 156 and the low pressure adjustment spacer or stop 164.

As mentioned above, the position of the disc retainer 150, yoke 142 and pressure position stem 156 is determined by the balance of forces between the high pressure spring 120 and the fluid pressure in the first pressure chamber 112 that is acting against the surface area of the upper diaphragm 110. This balance of forces causes the pressure management control pilot 100 to maintain a position that regulates pressure at the adjusted high pressure set point, as illustrated in FIG. 3.

With continuing reference to FIG. 3, the relationship between the relative positions of the internal components of the control pilot 100 and the relative pressure between the first and second chambers 112 and 136 (illustrated as the upper and lower chambers, respectively) when in the high pressure position is shown. It can be seen that the pressure position stem 156 has come into contact with the shoulder or stop 160 of the pressure position stem guide 130, due to the greater pressure in the first chamber 112 as compared to the second chamber 136, which forces the second diaphragm 132 downward and into the second pressure chamber 136. This moves retainer disc 150 away from seat 154, compressing low pressure spring 152 and opening the gate, and thus the fluid pathway between the inlet 138 and the outlet 140 of the second pressure chamber 136. Thus, the control pilot 100 maintains the position that regulates pressure at the high pressure set point in FIG. 3.

During low flow demand conditions, as illustrated in FIG. 4, pressure in chambers 112 and 136 are acting on the lower diaphragm 132 to bias the disc retainer 150 towards the seat 154 of the gate and towards a closed position, as illustrated. In this condition, the pressure in the first chamber 112 is less than or equal to the pressure in the second chamber 136 and bias of spring 152, causing the lower diaphragm 132 to move upwardly into the first chamber 112, as illustrated in FIG. 4. The result is that the disc retainer 150 is moved upwardly as well into an increasingly closed position with respect to the seat 154. Of course, this limits the passageway for fluid to pass through the inlet 138 and outlet 140.

When the pressure in the first chamber 112 is less than the second chamber 136, the pressure position stem 156 is moved towards or even into contact with the low pressure adjustment spacer or stop 164. In FIG. 4, the pressure position stem 156 is shown moved into contact with the spacer or stop 164, illustrating the control pilot 100 regulating at the low pressure set point. Low pressure set point is determined by the adjusted low of the high pressure spring 120 and the adjusted position of the low pressure adjustment spacer or stop 164, by means of the low pressure adjustment screw 166. The position of the low pressure adjustment spacer or stop 164 is determined by the balance of forces between the high pressure spring 120 and the pressure acting on the surface of the first diaphragm 110 and the pressure acting on the surfaces of the second or lower diaphragm 132.

With reference now to FIG. 5, during transitional flow conditions, the pressure management control pilot 100 is regulating in a range between the low and high pressure set points. In this condition, there is a gap between the shoulder 160 of the pressure position stem 130 and the lip 158 of the pressure position stem guide 156, as illustrated in FIG. 5.

In the transitional flow condition, the water pressure in the first chamber 112 is approximately equal to (or slightly more or slightly less than) the water pressure in the second chamber 136 and bias of spring 152. In this state, there is a gap between the shoulder or stop 160 of the pressure position stem 130 and the lip 158 of the pressure position stem guide 156, as described above, indicating that the pressure management control pilot 100 is regulating in a transition zone between the low and high pressure set points. The upper end 162 of the pressure position stem guide 156 is also in spaced relation to the spacer or stop 164. Thus, in the transitional flow, the pressure position stem 156 travels between the low pressure stop 164 and the high pressure stop or shoulder 160. The second or lower diaphragm 132 is in more of a neutral position, and the disc retainer 150 is also in an intermediate position with respect to the seat 154, such that fluid flows from the inlet 138 to the outlet 140, but not as freely as in FIG. 3, when the control pilot 100 is regulating pressure at the high pressure set point.

The adjustable pressure management control pilot 100 can be used to manage pressure in a water distribution system. The relative value of the first pressure chamber 112 of the adjustable pressure management control pilot 100 is used to control the position of a pressure reducing valve 200, sometimes referred to herein as a main valve, so that it regulates system pressure between the high and low pressure set points.

Figure 6:
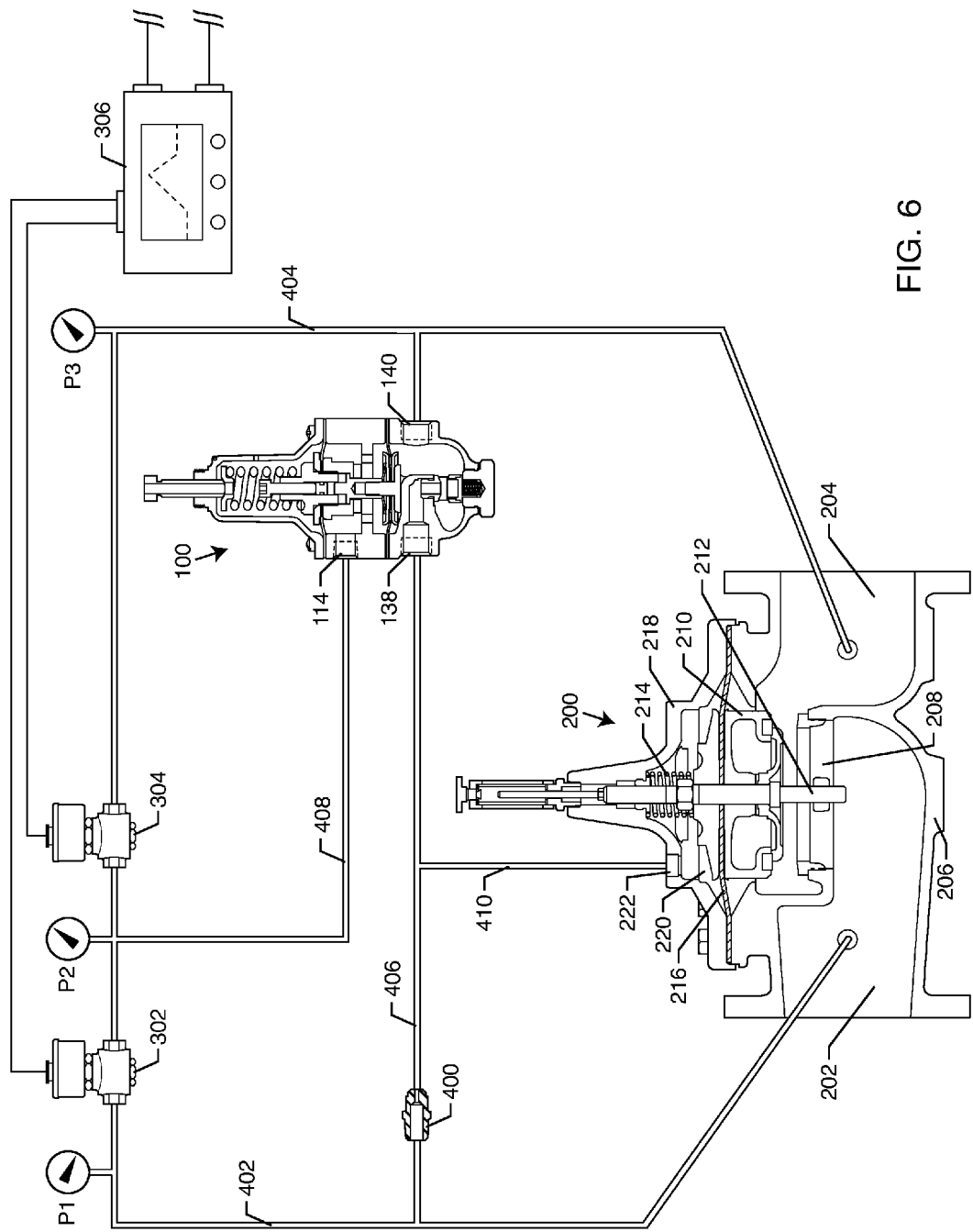
FIG. 6 is a diagrammatic illustration of the control pilot of the present invention operably connected to a pressure reducing valve and an electronic control system, illustrating the system in normal to high flow demand situations.
Figure 7:
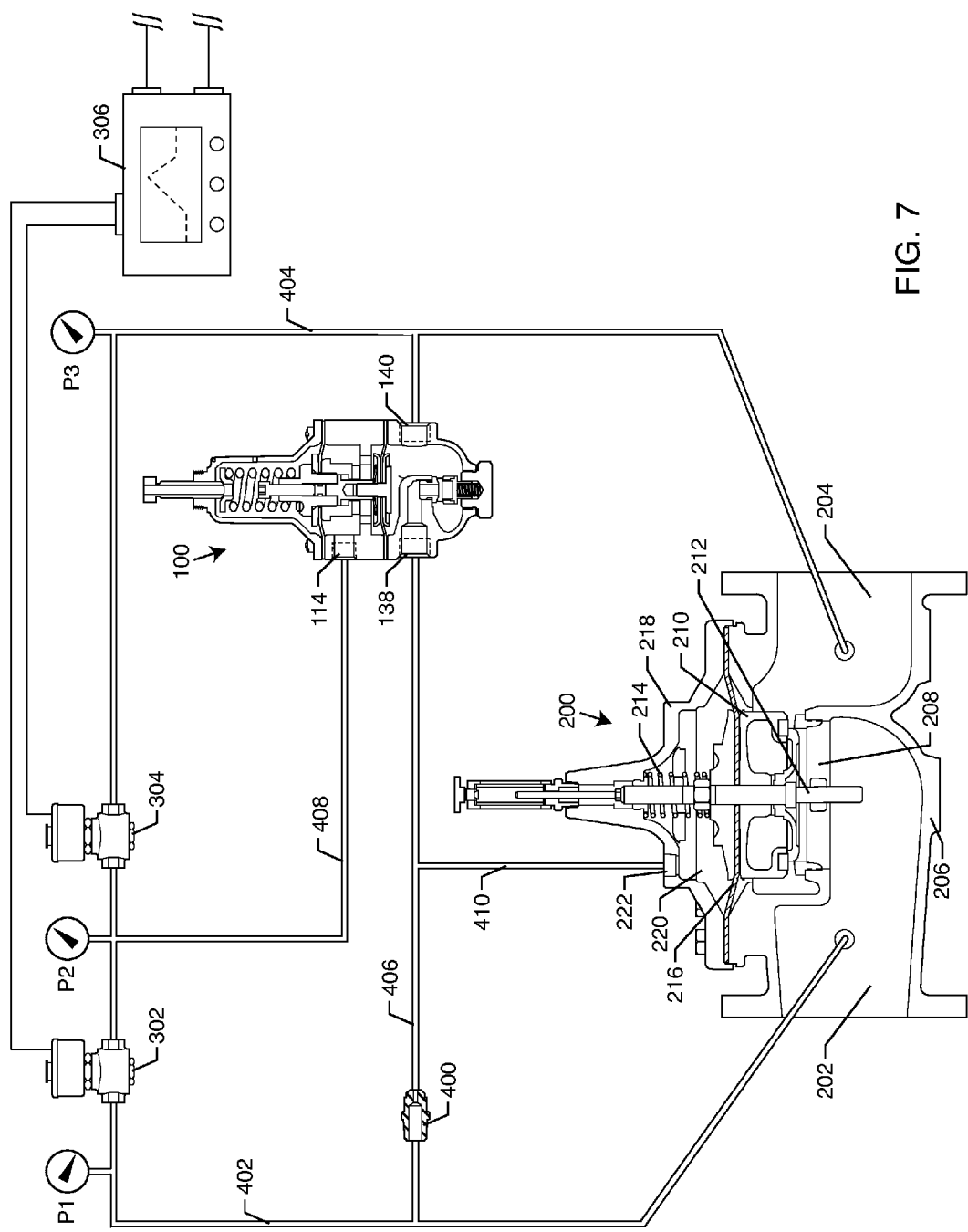
FIG. 7 is a diagrammatic view similar to FIG. 6, but illustrating the system regulating pressure during low flow demand.

A first example of such a system is illustrated in FIGS. 6 and 7, wherein the pressure in the first chamber 112 of the pressure management control pilot 100 is controlled by the activity of electronically actuated valves. As illustrated in FIGS. 6 and 7, two electronically actuated valves 302 and 304, such as solenoid valves, are shown, which can be alternately opened and closed, such as by an electronic controller 306 to maintain the desired pressure in the first pressure chamber 112 of the control pilot 100.

With reference to FIGS. 6 and 7, it can be seen that valves 302 and 304 are electronically coupled to controller 306. The first valve 302 is fluidly coupled to an inlet 202 of the pressure reducing valve 200, such as by means of conduit 402. The second electronically controlled valve 304 is fluidly coupled to the outlet 204 of the pressure reducing valve 200, such as by means of conduit 404. A fixed orifice 400 is disposed between the inlet 202 of the pressure reducing valve 200 and the inlet 138 of the second pressure chamber 136 of the control pilot 100. This is by means, for example, of conduit 406. A fluid conduit 408 is fluidly coupled to the fluid passageway 114 of the first chamber 112 of the control pilot 100, and is fluidly coupled to both electronically controlled valves 302 and 304.

The pressure reducing or main valve 200 is comprised of a valve body 206 which defines the inlet and outlet 202 and 204. Intermediate the inlet and outlet 202 and 204 is a main valve seat 208. A main valve member is moveable between an open position away from the main valve seat 208 and a closed position engaging the main valve seat. The main valve member 210 includes a moveable stem 212 for guiding the main valve member 210 into and out of engagement with the main valve seat 208. A spring 214 is typically also implemented in facilitating and guiding the main valve member 210 movement. A main valve diaphragm 216 is coupled to the main valve member 210 and extends between the main valve body 206 and a cover 218 of the main valve 200 so as to define a fluid control chamber 220 between the diaphragm 216 and the cover 218, or other portion of the body 206. The control chamber 220 includes an inlet port 222 for fluid coupling with the pilot valve 100, such as by means of conduit 410.

During high flow or high demand situations, as will be more fully described herein, less fluid is directed into the fluid control chamber 220, resulting in a lower pressure and enabling the main valve member 210 to move away from the main valve seat 208 into an open position, as illustrated in FIG. 6, to prevent more fluid to flow through the pressure reducing or main valve 200. However, during low flow or low demand situations, as illustrated in FIG. 7, fluid flow into the control chamber 220 of the pressure reducing valve causes the main valve member 210 to move downwardly towards engagement with the main valve seat 208, and reduce the flow of fluid through the pressure reducing or main valve 200.

With reference again to FIG. 6, during normal to high flow situations, the high pressure management chamber 112 of the control pilot 100 is significantly higher than at pressure gauge P3. Pressure in the first chamber 112 is maintained at a higher value than the pressure at pressure gauge P3 when the solenoid control valve 302 is open and solenoid control valve 304 is closed. The activity of the solenoid control valves 302 and 304 are controlled by the process controller 306. This causes the pressure management control pilot 100 to regulate at or near the high pressure set point.

The pressure reducing or main valve 200 position is controlled by flow through the pressure management control pilot 100. The fluid pressure at the outlet of the second chamber 136 is substantially equal to outlet pressure of the pressure reducing valve 200. When the flow area through the gate of the pressure management control pilot 100 is equal to the flow area of the fixed orifice 400, then little or no flow occurs into or out of the pressure chamber 220 of the main valve 200. During this condition, the pressure reducing valve 200 position remains unchanged and flow through this valve 200 and pressure at gauge P3 are relatively constant.

When system flow demand increases or decreases, pressure management control pilot 100 responds by increasing or decreasing the flow area through the second pressure chamber 136. When the flow area through the gate, or second pressure chamber 136, is greater than or less than the flow area of the fixed orifice 400, then this accordingly causes the flow to travel into or out of the cover pressure chamber 220 of the pressure reducing valve 200, which causes the pressure reducing valve position to change. As indicated above, FIG. 6 illustrates a normal to high flow demand, and thus the pressure reducing valve assembly 200 is in an open position to allow water to flow therethrough.

During a normal to high flow demand situation, as illustrated in FIG. 6, the control pilot 100 components would be in a position as illustrated in FIG. 3, either modulating between stops 160 and 164, or having the lip 158 engaged with shoulder or stop 160 at the high pressure set point. The gate would be at least partially or fully open, in that the disc retainer 150 would be moved away from seat 154, so as to permit fluid to flow into inlet 138 and out of outlet 140.

With reference now to FIG. 7, the system is shown regulating pressure during low flow demand. During low flow situations, the pressure in the first chamber 112 (or pressure management chamber) of the control pilot 100 is less than or equal to the pressure at gauge P3. Pressure in the first chamber 112 is maintained at the pressure value at gauge P3 when solenoid control valve 302 is closed and solenoid control valve 304 is open. When the adjustable pressure management control pilot 100 is in the low pressure set point mode, as described above and illustrated in FIGS. 7 and 4, the pressure position stem 156 is in contact with the low pressure adjustment spacer or stop 164. As long as these are in contact, the control pilot 100 regulates at or near the low pressure set point.

When fluid pressure in the first chamber 112 is less than the fluid pressure in the second chamber 136, the pressure differential across the second or lower diaphragm 132 biases the pressure position stem 156 upward until it comes into contact with the low pressure adjustment spacer or stop 164. Further upward travel is limited by the set position of the spacer or stop 164, such as by adjusting the low pressure adjustment screw 166, which is used to establish the low pressure set point of the adjustable pressure management control pilot 100.

When the fluid pressure in the first chamber 112 is equal to or less than the pressure at gauge P3, this causes the pressure management control pilot 100 to regulate at or near the low pressure set point, as described above. This causes an increase in pressure into the pressure regulating or main valve cover pressure chamber 220, increasingly closing the main valve member 210 towards the main valve seat 208 such that a lower fluid flow is passed therethrough, as illustrated in FIG. 7. The increase in fluid flow and pressure into control chamber 220 is caused by the fact that the disc retainer 150 is moved towards seat 154, effectively closing the gate of the second diaphragm assembly, and restricting or preventing fluid flow between the inlet 138 and the outlet 140, diverting the fluid flow into conduit 410 and into the control chamber 220, which acts upon diaphragm 216 to push valve member 210 downwardly towards seat 208, and close the pressure reducing or main valve 200.

Figure 8:
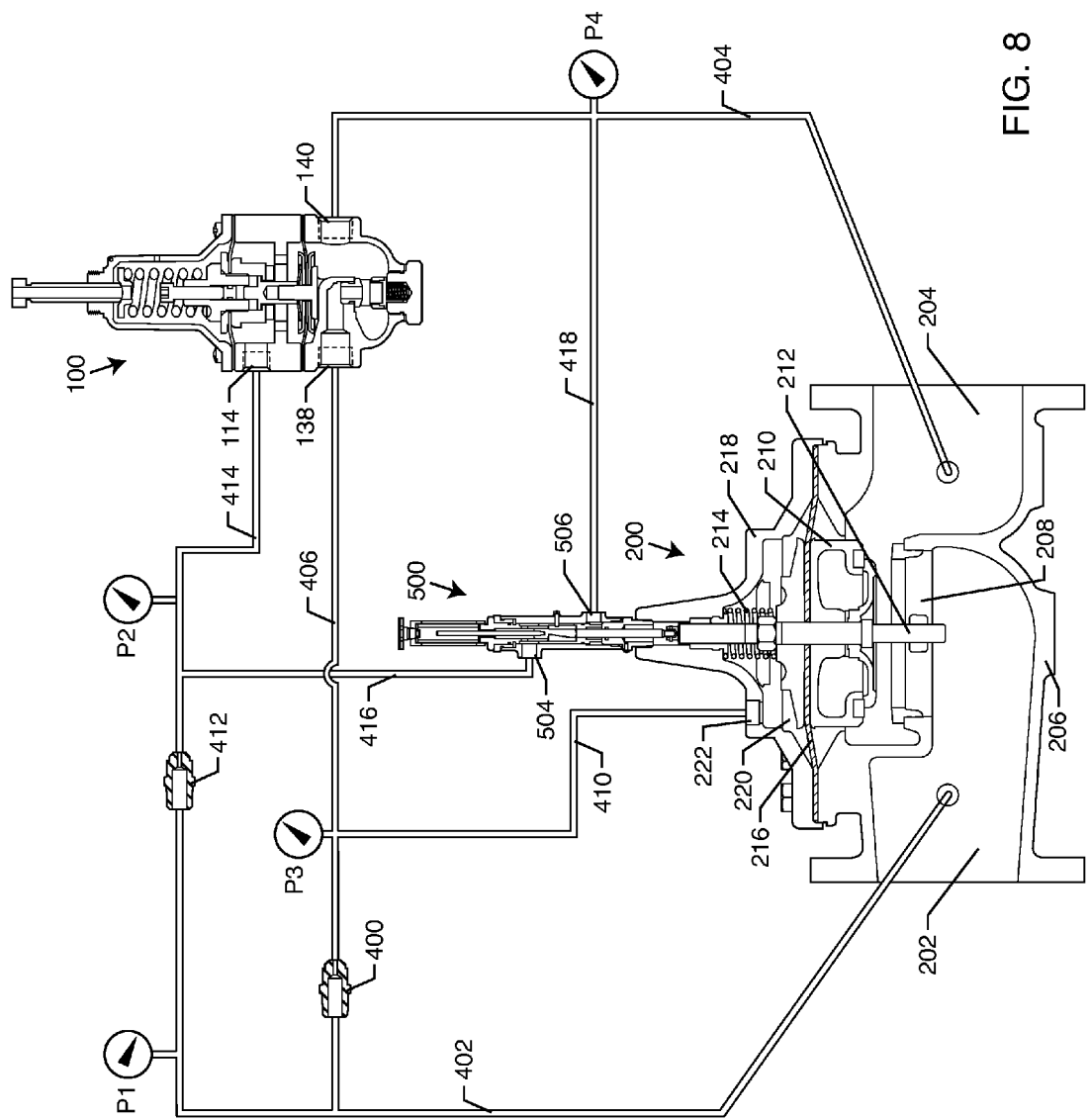
FIG. 8 is a diagrammatic view of the control pilot operably connected to a pressure reducing valve having a variable orifice assembly coupled thereto, during normal to high flow demand conditions.
Figure 9:
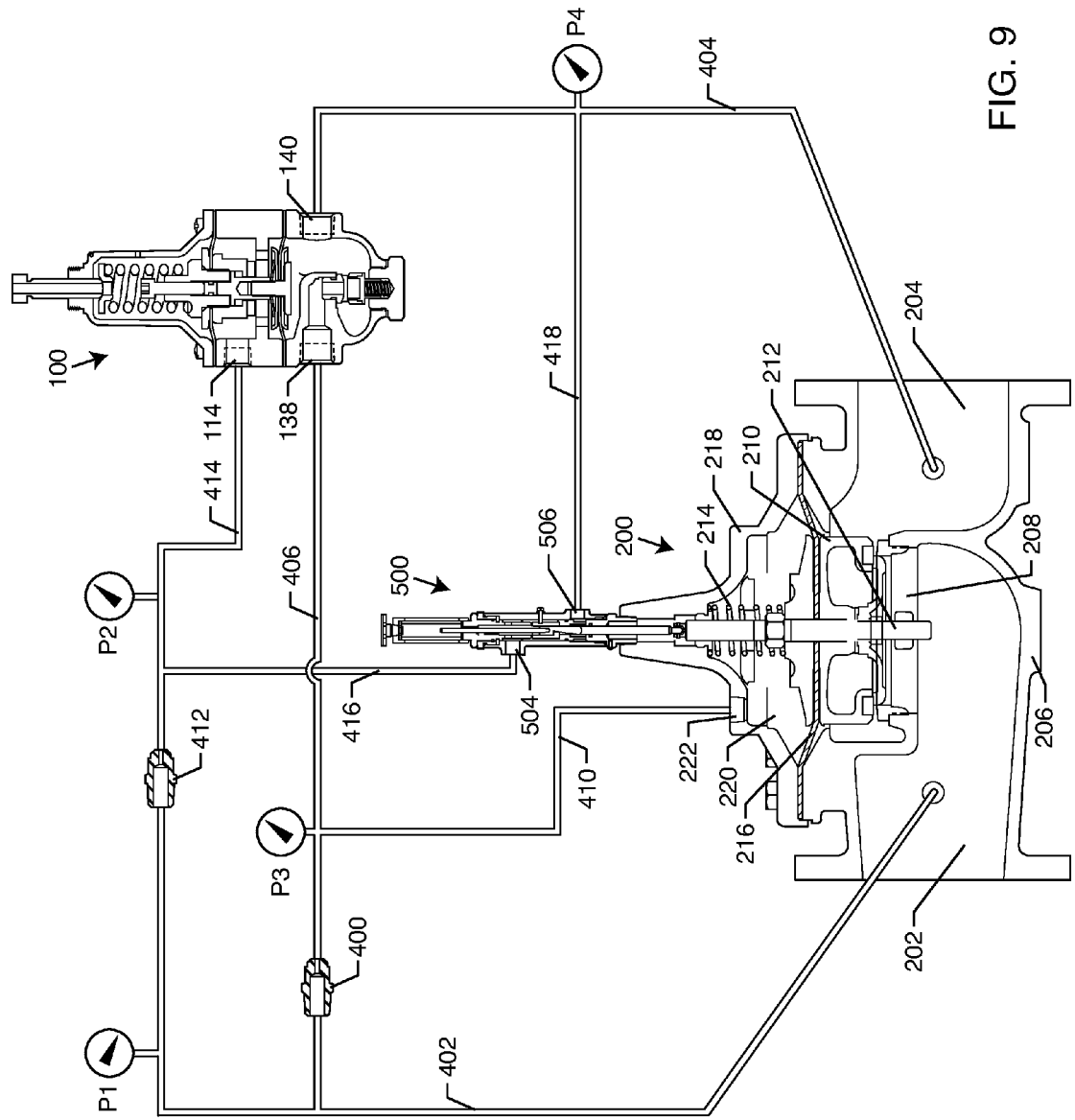
FIG. 9 is a diagrammatic view similar to FIG. 8, illustrating pressure regulation during low flow demand conditions.

Utilizing an electronic process controller and electronically controlled valves, such as those illustrated and described above, is not always ideal. An electronic process controller and solenoid valves or the like can increase the cost and complexity of the system. Moreover, a power source is required to power these electronic components. Accordingly, in a particularly preferred embodiment, such as illustrated in FIGS. 8 and 9, a completely hydraulically controlled and adjusted system is used. Such a system incorporates the use of an adjustable variable orifice assembly, generally referred to by the reference number 500. Exemplary adjustable variable orifice assemblies are disclosed in detail in pending U.S. patent application Ser. No. 11/927,474, the contents of which are hereby incorporated by reference.

With reference now to FIG. 8, the pressure management control pilot 100 is controlled by the activity of an adjustable variable orifice assembly 500. Flow through the adjustable variable orifice assembly 500 is a function of the position of the main valve or pressure reducing valve 200.

Figure 15:
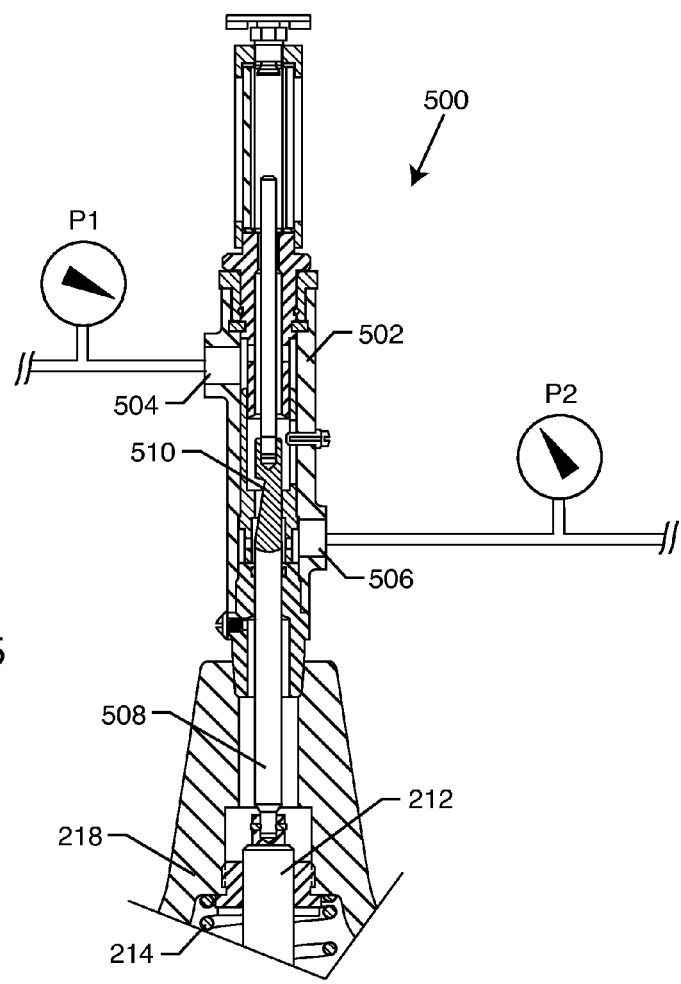
FIG. 15 is an enlarged sectional view of the variable orifice assembly.

With reference now to FIG. 15, the variable orifice assembly 500 includes a housing 502 defining a fluid inlet 504 and a fluid outlet 506. Typically, the housing 502 is coupled to the main valve cover 218, as illustrated. However, fluid pressures within the variable orifice assembly 500 and the pressure reducing or main valve 200 are isolated from one another. A stem 508 is coupled to the stem 212 of the pressure reducing valve and slideably disposed within the housing 502 of the variable orifice assembly 500. In this manner, as the main valve member 210 and stem 212 move up and down, the stem 508 of the variable orifice assembly 500 also moves up and down. The housing 502 and the stem 508, and any inserts or components disposed therebetween, form a variable orifice between the inlet 504 and the outlet 506. Thus, depending upon the position of the stem 508 within the housing 502, the fluid flow between inlet and outlet 504 and 506 varies.

FIG. 8 illustrates the adjustable pressure management control pilot 100 in the high pressure set point mode. As noted above, this is the position where the shoulder or lip of the pressure position stem 156 is resting on the shoulder or stop 160 of the pressure position stem guide 130. As long as the pressure position stem lip 158 and the shoulder of the pressure position stem guide 160 are in contact, the pressure management control pilot 100 regulates at or near the high pressure set point. When regulating in this mode, the pressure at gauge P2 and the first pressure chamber 112 is higher than the pressure at gauge P4 and the second pressure chamber 136. Pressure at gauge P2 is higher than gauge P4 because the flow area through the fixed orifice 412 is greater than the flow area through the adjustable variable orifice assembly 500.

During normal to high flow situations, the pressure at gauge P2 is greater than the pressure at gauge P4, causing the pressure regulating control pilot 100 to be biased towards the open position. When biased towards the open position, disc retainer 150 is moved away from seat 154, and thus the gate and fluid passageway between inlet 138 and outlet 140 is open. When biased towards the open position, flow area through the pressure regulating control pilot 100 is greater than the flow area through fixed orifice 400. This causes fluid to exit the main valve cover pressure chamber 222, which causes the main valve member 210 to open away from the main valve seat 208. The main valve, or the pressure regulating valve, 200 will continue to open until pressure at gauge P4 increases to the high pressure set point established by the pressure regulating control pilot 100.

When the pressure reducing or main valve 200 position is in normal to high flow conditions, the flow through the variable orifice assembly 500 is restricted, causing the pressure at gauge P2 to be greater than the pressure at gauge P4. As can be seen in FIG. 8, the fluid passageway 114 to the first pressure chamber 112 of the control pilot 100 is fluidly coupled to the variable orifice assembly 500, such as by conduits 414 and 416. The outlet 506 of the variable orifice assembly 500 is fluidly coupled to the outlet 204 of the main or pressure reducing valve 200 and the outlet 140 of the second chamber 136 of the control pilot 100, such as by conduit 418. As long as the pressure in the first pressure chamber 112 is greater than the second pressure chamber 136 of the control pilot 100, the pressure regulating control pilot 100 regulates at or near the high pressure set point, as illustrated in FIG. 8.

With reference now to FIG. 9, the adjustable pressure management control pilot 100 is illustrated in the low pressure set point mode. In this position, as described above, where the pressure position stem 156, and particularly the upper end 162 thereof is in contact with the low pressure adjustment spacer or stop 164, the adjustable pressure management control pilot 100 regulates at or near the low pressure set point. When fluid pressure in the first chamber 112 is less than the pressure in the second chamber 136, the pressure differential across the second or lower diaphragm 132 biases the pressure position stem 156 upward until it comes into contact with the low pressure adjustment spacer or stop 164. Such position is shown in FIG. 4.

During low-flow situations, the pressure at gauge P2 is less than the pressure at gauge P4, causing the pressure regulating control pilot 100 to be biased towards the closed position. That is, the gate is closed or nearly closed in that the disc retainer 150 is moved towards the seat 154, restricting or preventing fluid flow between inlet 138 and outlet 140. When biased towards the closed position, flow area through the pressure regulating control pilot 100 is less than the flow area through fixed orifice 400. This causes flow to enter the pressure reducing or main valve cover pressure chamber 222, causing the main valve position to travel towards the closed position, as illustrated in FIG. 9. The main or pressure reducing valve 200 will continue to close until the pressure at gauge P4 decreases to the low pressure set point established by the pressure regulating control pilot 100. When the main valve or pressure reducing valve 200 position is in a low-flow condition, as illustrated in FIG. 9, the flow through the variable orifice assembly 500 is unrestricted. Flow area through the fixed orifice 400 is less than the flow area through the variable orifice assembly 500, causing the pressure at gauge P2 to be less than the pressure at gauge P3.

When at or near the low pressure regulating mode, the pressure gauge P2 and the pressure of the first chamber 112 is equal to or lower than the pressure at gauge P4 and the pressure within the second chamber 136. Pressure at gauge P2 is lower than at gauge P4 because the flow area through the fixed orifice 412 is less than the flow area through the adjustable variable orifice assembly 500. This flow area difference causes more flow to exit through the adjustable or variable orifice assembly 500 than is supplied to fixed orifice 412. As a result, pressure at the first chamber 112 drops to a value less than or equal to the pressure at gauge P3 and the pressure within the second pressure chamber 136. As long as the pressure in the first pressure chamber 112 is less than the second pressure chamber 136, the pressure regulating control pilot assembly 100 regulates at or near the low pressure set point.

Figure 10:
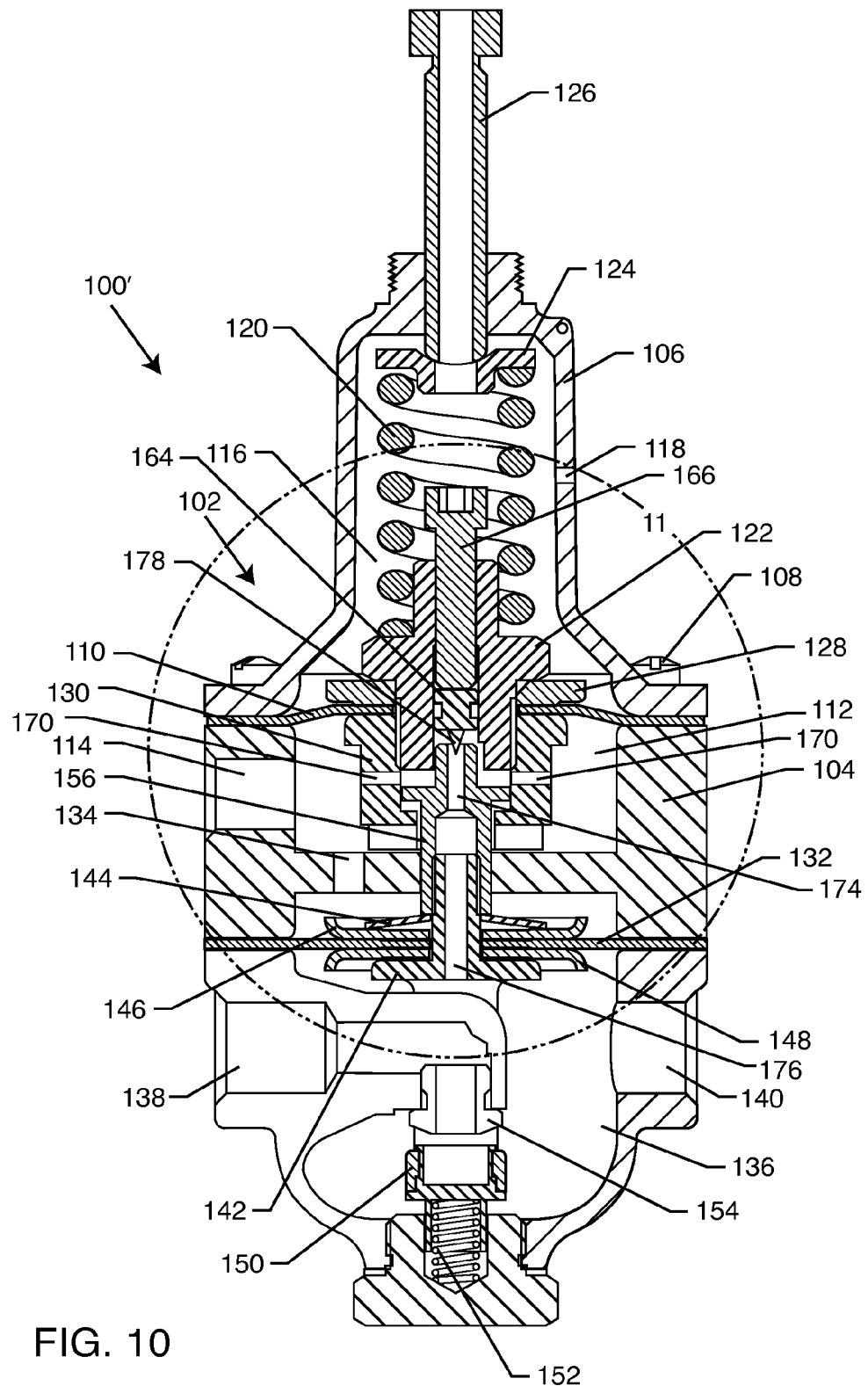
FIG. 10 is a cross-sectional view of another control pilot embodying the present invention.
Figure 11:
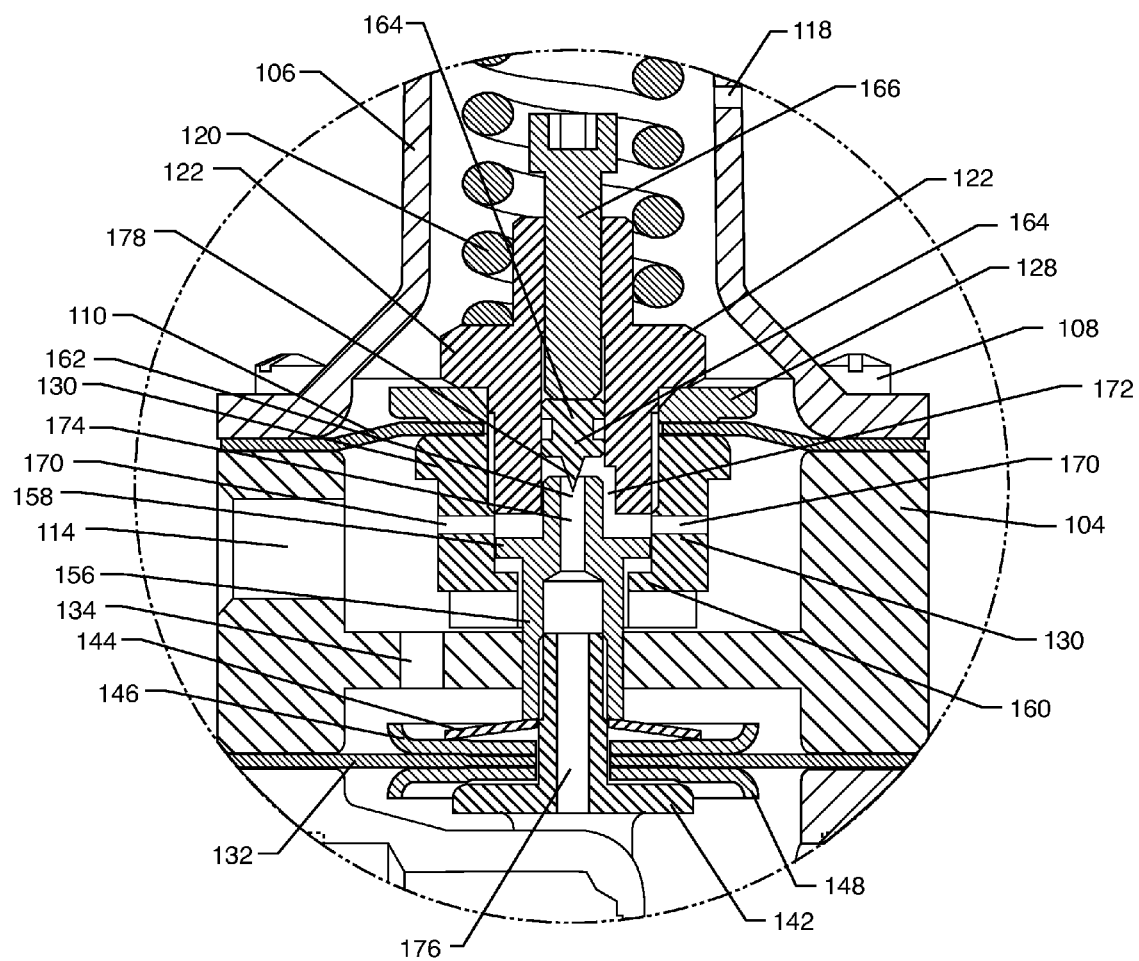
FIG. 11 is an enlarged sectional view of area "11" of FIG. 10.

With reference now to FIGS. 10 and 11, a modified pressure regulating control pilot 100' is shown. This control pilot 100' operates under the same principles, and has the same components as the control pilot 100 illustrated and described above. For ease of explanation, those components which are in common between the control pilots 100 and 100' are referenced by the same reference number. The primary difference between this control pilot 100' and the control pilot 100 illustrated and described above is that instead of the first fluid chamber 112 and second fluid pressure chamber 136 being completely separate from one another, there is a fluid passageway formed in the first diaphragm assembly and the second diaphragm assembly which allows a degree of fluid communication between the fluid pressure chambers 112 and 136. This fluid pathway, as will be more fully described herein, is opened or closed depending upon the relative position of the first and second diaphragm assemblies.

With continuing reference to FIGS. 10 and 11, it will be seen that the one or more apertures 170 are formed in the stem guide 130, and which are in fluid communication with the first fluid pressure chamber 112. Flutes 172 or other openings are formed between the spring guide 122 and pressure position stem 156 to allow fluid to pass from the apertures 170 to a passageway 174 formed along the length of the pressure position stem 156, through passageway 176 formed through stem 142 and into the second fluid pressure chamber 136. When the first and second diaphragms 110 and 132 are moved away from one another, and thus the assemblies associated therewith, fluid is allowed to pass through the apertures 170, and the spaces formed between the spring guide 122 and the pressure position stem 156, and through passageways 174 and 176 which are aligned or otherwise in fluid communication, into the second fluid pressure chamber 136.

It will be seen in FIGS. 10 and 11 that the spacer 164 has a projection 178 extending from an end thereof which serves as a plug to close off the passageway 174 of the pressure position stem to prevent fluid flow between the first and second fluid pressure chambers 112 and 136. This occurs when the first and second diaphragm assemblies are moved towards one another, or the upper or lower assembly moved towards the corresponding assembly such that the plug 178 enters into the fluid passageway 174 of the pressure position stem 156. In a particularly preferred embodiment, as illustrated, the projection plug 178 is of a variable diameter, such as an increasingly small diameter to form a needle-like structure, such that a variable valve is created between plug 178 and passageway 174. Thus, the passageway 174 is increasingly opened and closed as the plug 178 is entered therein and extracted therefrom due to the movement of the diaphragms 110 and 132, and their associated assembly components. It has been found that incorporating such a fluid flow pathway in the control pilot 100' provides greater control and smoother operation to control pilot 100'.

Figure 12:
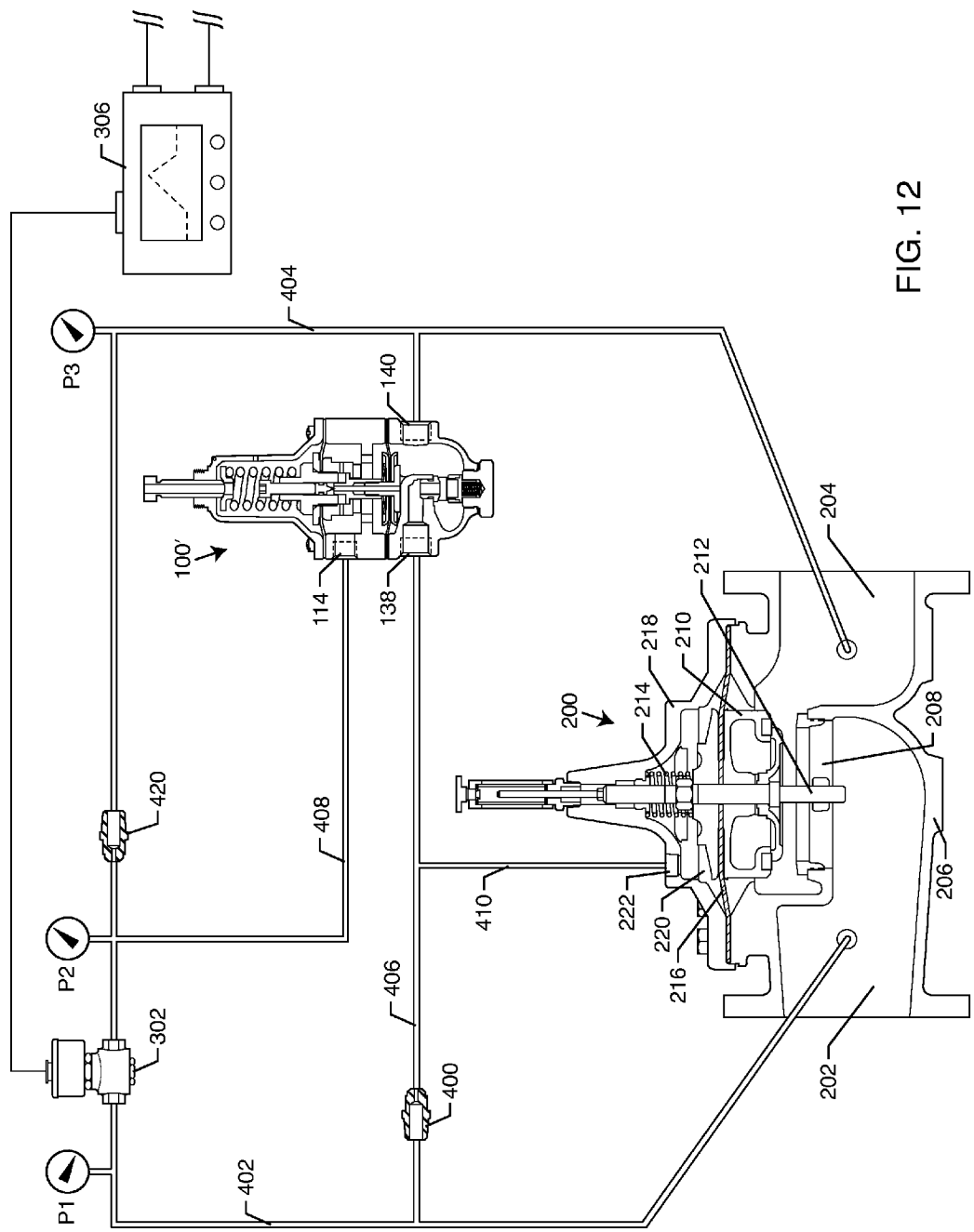
FIG. 12 is a diagrammatic illustration of the control pilot of FIG. 10 operably connected to a pressure reducing valve and an electronic control system, illustrating the system in normal to high flow demand situations.

With reference now to FIG. 12, the control pilot 100' incorporated into an assembly or system for regulating system pressure between high and low pressure set points in conjunction with an electronically actuated valve 302 and an electronic controller 306 is shown. This is similar in operation to the systems described above with respect to FIGS. 6 and 7. However, in this case, instead of two electronically actuated valves 302 and 304, a single electronically actuated valve 302 is used. In place of the second electronically actuated valve 304, a fixed orifice 420 is disposed in the line 404. The fixed orifice preferably has a flow passageway sized so as to permit a lower flow therethrough than through the passageway 170-176 of the control pilot 100'. When the single electronically actuated valve 302 is energized or opened, this allows a greater flow, and thus pressure, into the upper pressure chamber 112, driving the control pilot 100', and thus the system, towards the high pressure set point as the upper and lower diaphragms are moved away from one another, opening gate 150. FIG. 12 illustrates the system at the high pressure set point.

However, when the solenoid valve 302 is closed, pressure increases in the lower or second fluid pressure chamber 136 relative to the upper or first chamber 112, driving the system towards the low pressure set point as the stem 142 is moved increasingly upwardly and towards spacer 164. Not only is disc retainer 150 moved towards seat 154, closing the gate passageway between the inlet 138 and outlet 140 of the second fluid pressure chamber 136, but the plug 178 is moved into fluid passageway 174 of the pressure position stem 156 so as to increasingly close the fluid passageway 170-176 between the fluid pressure chambers 112 and 136. When the system is in a low flow or low pressure mode, the second diaphragm 132 is moved upwardly, and the pressure reducing, main, valve 200 components are positioned as illustrated in FIG. 7 to limit the flow of fluid through the main valve 200.

Figure 13:
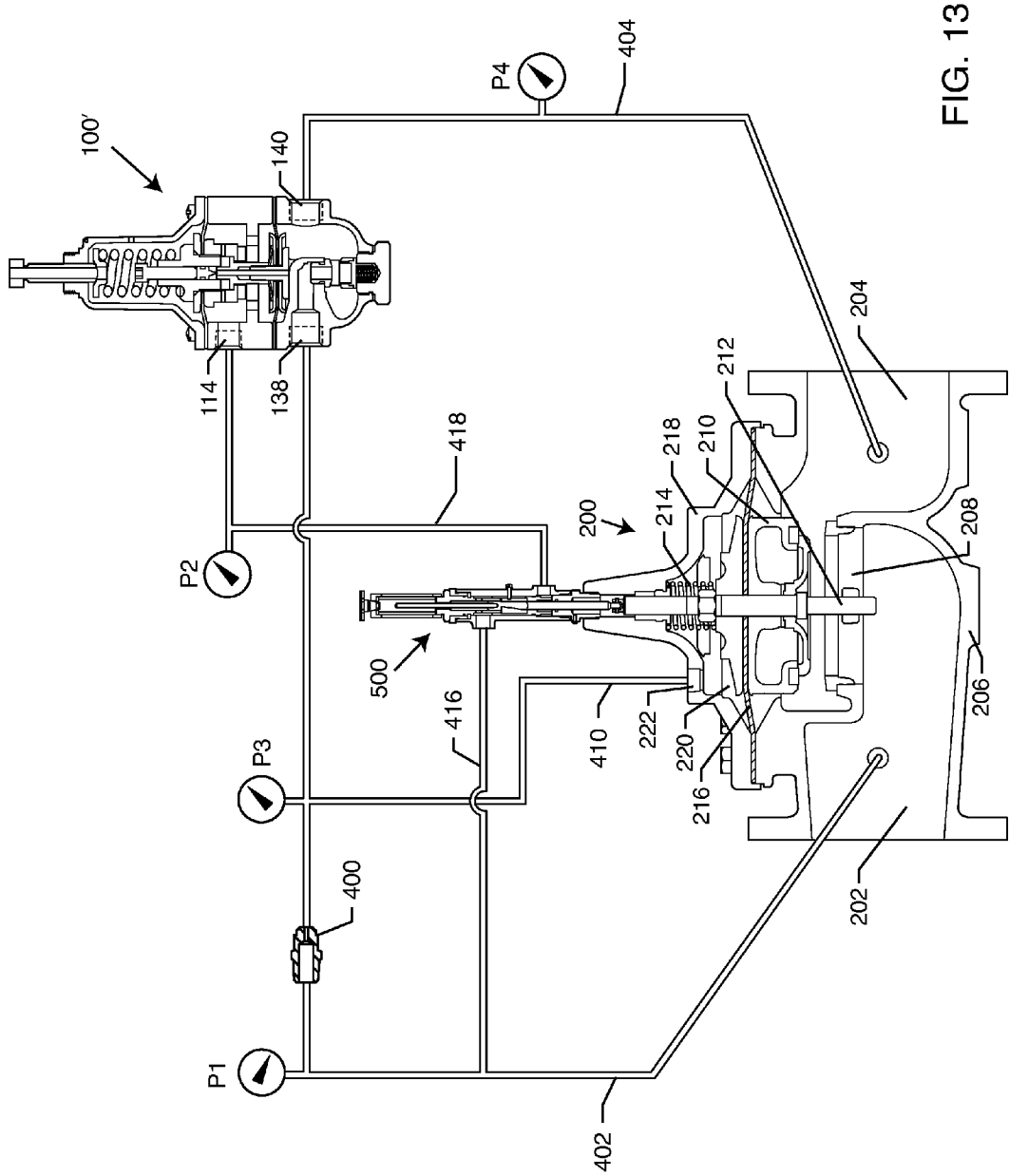
FIG. 13 is a diagrammatic view of the control pilot of FIG. 10 operably connected to a pressure reducing valve having a variable orifice assembly coupled thereto, during normal to high flow demand conditions.
Figure 14:
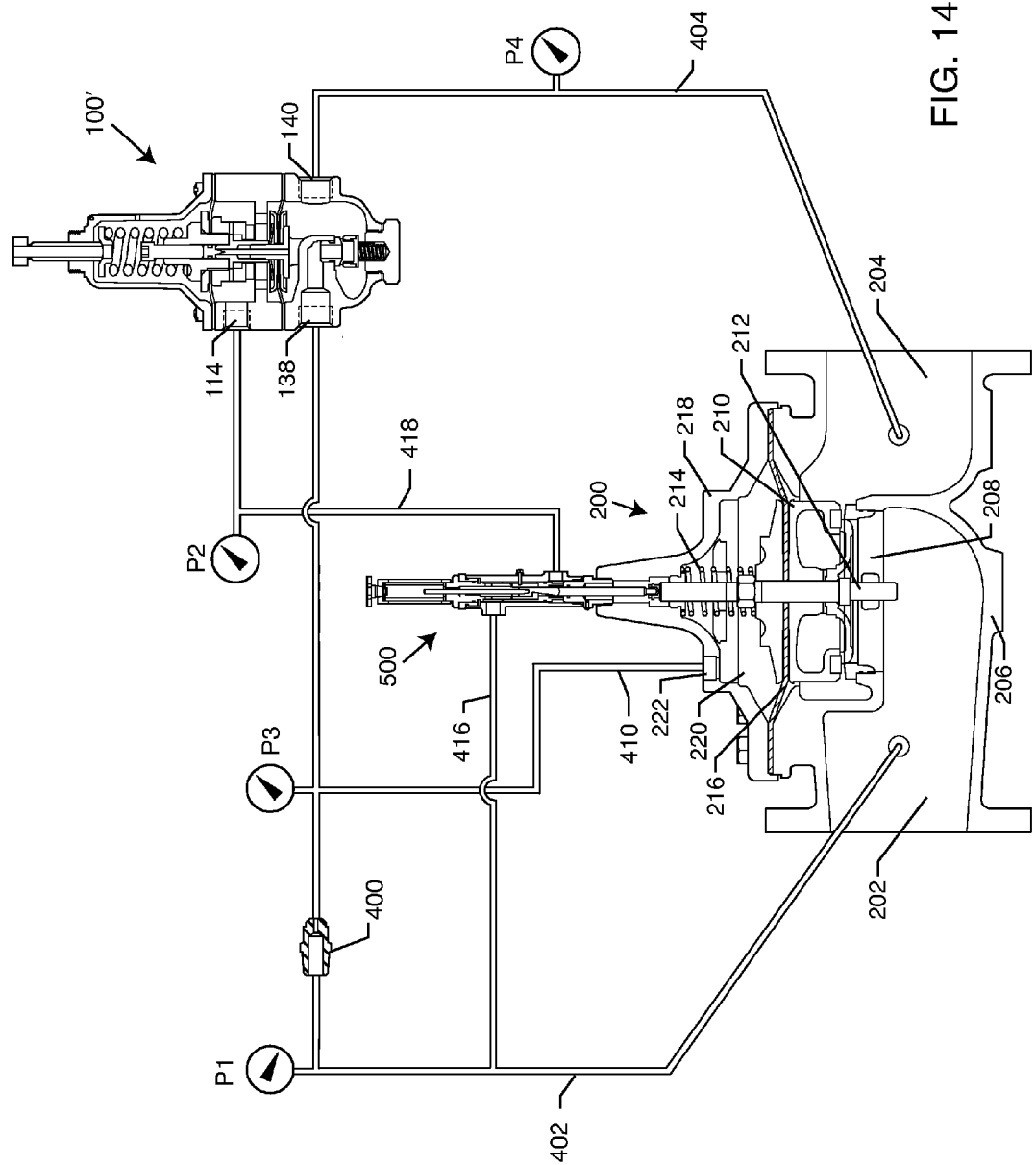
FIG. 14 is a diagrammatic view similar to FIG. 13, but illustrating pressure regulation during low flow demand conditions.

With reference now to FIGS. 13 and 14, the control pilot 100' is shown incorporated into a pressure regulating system which is hydraulically controlled, by virtue of incorporating a variable orifice assembly 500 onto the pressure reducing or main valve 200 in a manner similar to that described above in FIGS. 8 and 9. With particular reference to FIG. 13, during normal to high flow situations, the pressure at P2 is greater than the pressure at P4. This causes the pressure regulating control pilot 100' to be biased towards the open position. When biased towards the open position, flow through the pressure regulating control pilot 100' is greater than the flow area through fixed orifice 400. That is, the pressure in the upper or first fluid pressure chamber 112 is greater than the fluid pressure in the second fluid pressure chamber 136, causing the second diaphragm 132 to move downwardly, and disc retainer 150 to be moved away from seat 154, thus opening the gate or passageway between the inlet 138 and outlet 140 of the second fluid pressure chamber 136. The pressure in the first fluid chamber 112 varies through the opening or passageway 174 of the pressure position stem 156. As the stem 156 moves relative to position of low pressure adjustment spacer 164 such that it is moved away, so as to fully open the passageway 174 to flow therethrough, in this position the main valve 200 is progressing towards or regulating at the high pressure set point, as illustrated.

This causes flow to exit the main valve cover chamber 220, which causes the main vale 210 to position upwardly or open. Main valve 200 will continue to open until pressure at P4 increases to the high pressure set point established by the pressure regulating control pilot 100'.

When the main valve 200 position corresponds to the normal to high flow condition, the flow through the variable orifice assembly 500 is unrestricted, which causes the pressure at P2 to be greater than pressure at P4. Thus, the pressure in the first pressure chamber 112 is greater than the second pressure chamber 136 of the control pilot 100'. As long as the pressure in the first or upper chamber 112 is greater than the second or lower chamber 136, the pressure regulating control pilot 100' regulates at or near the high pressure set point.

With reference now to FIG. 14, during low flow situations, the pressure at P2 is equal to the pressure at P4. When pressure P2 is equal to pressure P4, this causes the pressure regulating control pilot 100' to be biased towards the closed position, that is the disc retainer 150 is moved towards seat 154 by the movement of the second diaphragm 132 as the pressure in the second fluid pressure chamber 136 is equal to or greater than the pressure in the first fluid chamber 112 of the control pilot 100'. In fact, if the pressure in the second fluid pressure chamber 136 approaches or equals the pressure in the first fluid pressure chamber 112, spring 152 will move the second diaphragm assembly, and thus the second diaphragm 132 upwardly and move the disc retainer 150 towards seat 154, thus closing the gate. This also moves pressure position stem 156 towards and into engagement with the spacer 164, and thus plug 178 increasingly closes passageway 174 to fluid flow.

When the control pilot 100' is biased towards the closed position, flow area through the pressure regulating control pilot 100' is less than the flow area through the fixed orifice 400, causing flow to enter into the main valve cover chamber 220, causing the main valve diaphragm 216 and main valve member 210 to move towards the closed position. Main valve 200 will continue to close until pressure at P4 decreases to the low pressure set point established by the pressure regulating control pilot 100'.

When the main valve 200 is moved towards the closed position, due to the low flow condition, flow through the variable orifice assembly 500 is restricted. Flow through the fixed orifice 400 is greater than flow through the variable orifice assembly 500, causing the pressure at P2 to be nearly equal to the pressure at P4. Typically, the flow between the first fluid pressure chamber 112 and second fluid pressure chamber 136 of the control pilot 100' is approximately the same as the flow through the variable orifice assembly 500. As long as the pressure in the first and second fluid pressure chambers 112 and 136 of the control pilot 100' is approximately equal, the pressure regulating control pilot 100' regulates at or near the low pressure set point.

Figure 16:
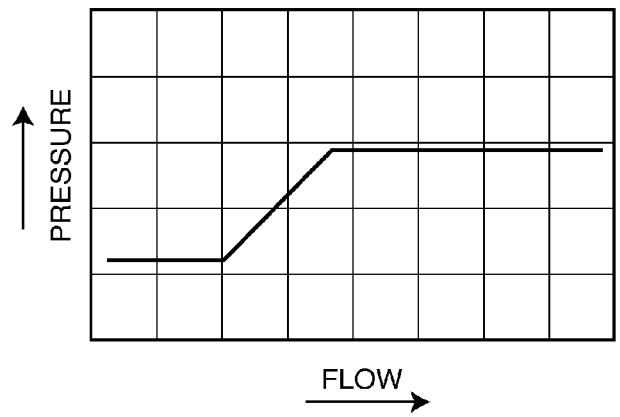
FIG. 16 is a chart illustrating the regulation profile with the variable orifice assembly of FIG. 15.
Figure 17:
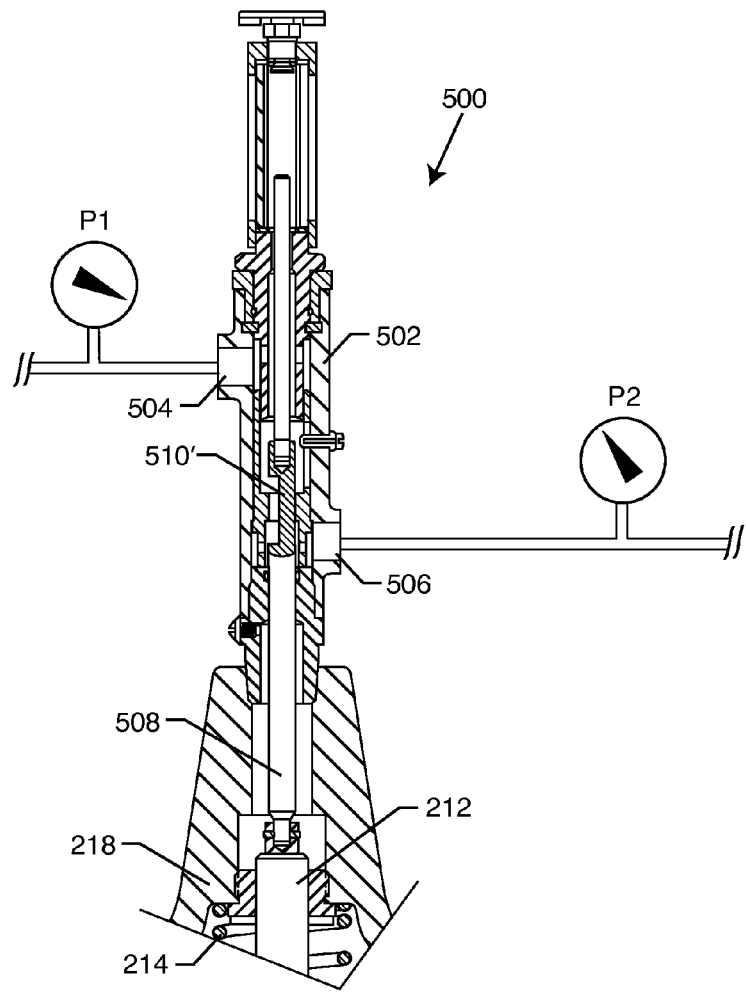
FIG. 17 is an enlarged sectional view of a variable orifice assembly similar to FIG. 15, but having a different stem profile.
Figure 18:
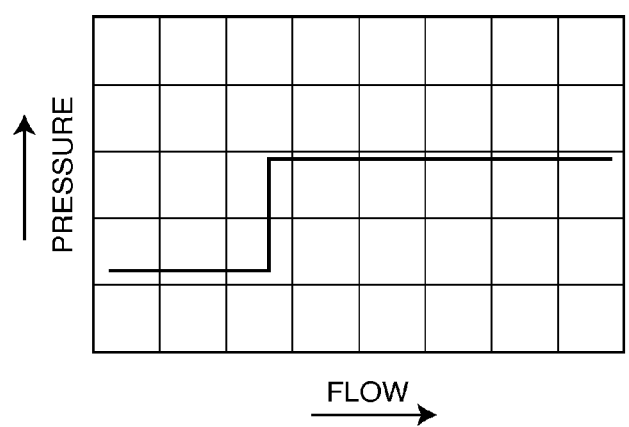
FIG. 18 is a chart illustrating the regulation profile with the variable orifice assembly of FIG. 17.

Flow area through the variable orifice assembly 500 can be altered, at least in part, due to the geometry of a portion 510 of the stem 508 which travels between the inlet and outlet 504 and 506 of the variable orifice assembly 500. The geometry 510 illustrated in FIG. 15 gradually transitions from the restricted to the unrestricted flow area geometry, as illustrated in the graph of FIG. 16. Different types of variable orifice geometry can be used to customize the pressure regulation profile between the low and high pressure set points. For example, the geometry 510' of the stem 508 illustrated in FIG. 17 uses a slot geometry on the variable orifice stem 508 that does not have a gradual flow transitional flow area profile. Instead, the slot (or flow area) detail is constant. By having constant slot geometry, the transition from unrestricted to restricted (or vice versa) flow area is sudden, as illustrated in the graph of FIG. 18. Although the variable orifice assembly 500 is identical except the flow geometry 510' in FIG. 17, the flow through the stem slot detail is either full capacity or full restriction, or "on" or "off". Thus, flow does not vary with valve position as with the variable orifice stem geometry design of FIG. 15. A sudden change in the flow area geometry has the effect of causing an immediate jump between the low and high pressure set points on the pressure management control pilot 100. From a product application standpoint, this might be useful in a water distribution system that has either low or high demand situations and does not require gradual transition between low and high pressure set points. In this case, the user may wish to ramp between the low and high pressure set points as quickly as possible, and the flow geometry 510' illustrated in FIG. 17 would accomplish this.

From the foregoing, it can be seen that the adjustable hydraulically operated pressure management control pilot assembly 100 can be used to set the water pressure high and low points so as to control the system water pressure between low demand periods and high demand periods. When incorporated into a larger assembly or system coupled to a pressure reducing valve, an improved flow-driven valve system for automatically controlling downstream pressure between selected set points is realized.

Although several embodiments have been described in detail for purposes of illustration, various modifications may be made without departing from the scope and spirit of the invention. Accordingly, the invention is not to be limited, except as by the appended claims.

What is claimed is:

1. A pilot valve assembly that controls a pressure reducing valve of a water supply system between high pressure and low pressure set points, the assembly comprising:
   a body defining an interior cavity;
   a first diaphragm assembly within the cavity and including a first diaphragm having a first surface thereof at least partially defining a first fluid pressure chamber in fluid communication with a fluid passageway formed in the body, and a first biasing means for biasing the first diaphragm; and
   a second diaphragm assembly within the cavity and including a second diaphragm having a first surface thereof at least partially defining the first fluid pressure chamber, and a second surface thereof at least partially defining a second fluid pressure chamber in fluid communication with a fluid inlet and a fluid outlet formed in the body, and a gate disposed between the fluid inlet and the fluid outlet for controlling fluid flow through the second fluid pressure chamber, and a second biasing means for biasing the gate and the second diaphragm;
   wherein fluid pressure at the outlet of the second chamber is substantially equal to outlet pressure of the pressure reducing valve; and
   wherein a second surface of the first diaphragm at least partially defines a third chamber within the body having atmospheric pressure.

2. The assembly of claim 1, wherein when a fluid pressure in the first fluid pressure chamber is approximately equal to or less than a low pressure set point the gate is moved towards a closed position to restrict the flow of fluid through the second chamber, and when the fluid pressure in the first fluid pressure chamber is equal to or greater than a high pressure set point the gate is moved towards an open position to facilitate flow of fluid through the second chamber.

3. The assembly of claim 1, including means for selectively adjusting the first biasing means to adjust a high pressure set point.

4. The assembly of claim 3, wherein the first biasing means comprises a spring and the adjusting means comprises a first adjustment screw coupled to the spring.

5. The assembly of claim 1, wherein the second biasing means comprises a spring biasing the gate towards a closed position.

6. The assembly of claim 1, wherein the ratio of the area of the first diaphragm to the second diaphragm is approximately 1:1.

7. The assembly of claim 1, wherein the inlet of the second fluid pressure chamber is fluidly coupled to a valve actuating pressure chamber of the pressure reducing valve.

8. The assembly of claim 1, including a fixed orifice between the inlet of the second fluid pressure chamber and the inlet of the pressure reducing valve.

9. The assembly of claim 1, wherein the first and second fluid pressure chambers are isolated from fluid communication with one another.

10. The assembly of claim 1, including a variable orifice assembly operably coupled to the pressure reducing valve and fluidly coupled to the pilot valve assembly and having a variable fluid flow between an inlet thereof and an outlet thereof.

11. The assembly of claim 10, including a variable orifice fluid flow stem coupled to the pressure reducing valve and slidably disposed between the fluid inlet and outlet of the variable orifice assembly, wherein the fluid flow through the inlet and outlet of the variable orifice assembly varies as the pressure reducing valve is opened and closed.

12. The assembly of claim 1, wherein the second diaphragm assembly includes a stem which extends into the first diaphragm assembly and slidably travels with respect thereto as the first diaphragm assembly and the second diaphragm assembly move relative to one another.

13. The assembly of claim 12, wherein the first diaphragm assembly includes first and second stops for limiting travel of the stem.

14. The assembly of claim 13, wherein the first and second stops move as the first diaphragm is moved.

15. The assembly of claim 14, including means for adjusting the first stop to adjust a low pressure set point.

16. The assembly of claim 15, wherein the adjusting means comprises a second adjustment screw.

17. A pilot valve assembly that controls a pressure reducing valve of a water supply system between high pressure and low pressure set points, the assembly comprising:
   a body defining an interior cavity;
   a first diaphragm assembly within the cavity and including a first diaphragm having a first surface thereof at least partially defining a first fluid pressure chamber in fluid communication with a fluid passageway formed in the body, and a first biasing means for biasing the first diaphragm; and
   a second diaphragm assembly within the cavity and including a second diaphragm having a first surface thereof at least partially defining the first fluid pressure chamber, and a second surface thereof at least partially defining a second fluid pressure chamber in fluid communication with a fluid inlet and a fluid outlet formed in the body, and a gate disposed between the fluid inlet and the fluid outlet for controlling fluid flow through the second fluid pressure chamber, and a second biasing means for biasing the gate and the second diaphragm;
   wherein fluid pressure at the outlet of the second chamber is substantially equal to outlet pressure of the pressure reducing valve; and
   wherein when a fluid pressure in the first fluid pressure chamber is approximately equal to or less than a low pressure set point the gate is moved towards a closed position to restrict the flow of fluid through the second chamber, and when the fluid pressure in the first fluid pressure chamber is equal to or greater than a high pressure set point the gate is moved towards an open position to facilitate flow of fluid through the second chamber.

18. The assembly of claim 17, wherein the second biasing means comprises a spring biasing the gate towards a closed position.

19. The assembly of claim 17, wherein the ratio of the area of the first diaphragm to the second diaphragm is approximately 1:1.

20. The assembly of claim 17, wherein the inlet of the second fluid pressure chamber is fluidly coupled to a valve actuating pressure chamber of the pressure reducing valve.

21. The assembly of claim 17, including a fixed orifice between the inlet of the second fluid pressure chamber and the inlet of the pressure reducing valve.

22. The assembly of claim 17, wherein the first and second fluid pressure chambers are isolated from fluid communication with one another.

23. The assembly of claim 17, including a variable orifice assembly operably coupled to the pressure reducing valve and fluidly coupled to the pilot valve assembly and having a variable fluid flow between an inlet thereof and an outlet thereof.

24. The assembly of claim 23, including a variable orifice fluid flow stem coupled to the pressure reducing valve and slidably disposed between the fluid inlet and outlet of the variable orifice assembly, wherein the fluid flow through the inlet and outlet of the variable orifice assembly varies as the pressure reducing valve is opened and closed.

25. The assembly of claim 17, including means for selectively adjusting the first biasing means to adjust a high pressure set point.

26. The assembly of claim 25, wherein the first biasing means comprises a spring and the adjusting means comprises a first adjustment screw coupled to the spring.

27. The assembly of claim 17, wherein the second diaphragm assembly includes a stem which extends into the first diaphragm assembly and slidably travels with respect thereto as the first diaphragm assembly and the second diaphragm assembly move relative to one another.

28. The assembly of claim 27, wherein the first diaphragm assembly includes first and second stops for limiting travel of the stem.

29. The assembly of claim 28, wherein the first and second stops move as the first diaphragm is moved.

30. The assembly of claim 29, including means for adjusting the first stop to adjust a low pressure set point.

31. The assembly of claim 30, wherein the adjusting means comprises a second adjustment screw.

32. A pilot valve assembly that controls a pressure reducing valve of a water supply system between high pressure and low pressure set points, the assembly comprising:
a body defining an interior cavity;
a first diaphragm assembly within the cavity and including a first diaphragm having a first surface thereof at least partially defining a first fluid pressure chamber in fluid communication with a fluid passageway formed in the body, and a first biasing means for biasing the first diaphragm; and
a second diaphragm assembly within the cavity and including a second diaphragm having a first surface thereof at least partially defining the first fluid pressure chamber, and a second surface thereof at least partially defining a second fluid pressure chamber in fluid communication with a fluid inlet and a fluid outlet formed in the body, and a gate disposed between the fluid inlet and the fluid outlet for controlling fluid flow through the second fluid pressure chamber, and a second biasing means for biasing the gate and the second diaphragm;
wherein fluid pressure at the outlet of the second chamber is substantially equal to outlet pressure of the pressure reducing valve; and
wherein the second biasing means comprises a spring biasing the gate towards a closed position.

33. The assembly of claim 32, wherein when a fluid pressure in the first fluid pressure chamber is approximately equal to or less than a low pressure set point the gate is moved towards a closed position to restrict the flow of fluid through the second chamber, and when the fluid pressure in the first fluid pressure chamber is equal to or greater than a high pressure set point the gate is moved towards an open position to facilitate flow of fluid through the second chamber.

34. The assembly of claim 32, wherein the ratio of the area of the first diaphragm to the second diaphragm is approximately 1:1.

35. The assembly of claim 32, wherein the inlet of the second fluid pressure chamber is fluidly coupled to a valve actuating pressure chamber of the pressure reducing valve.

36. The assembly of claim 32, including a fixed orifice between the inlet of the second fluid pressure chamber and the inlet of the pressure reducing valve.

37. The assembly of claim 32, wherein the first and second fluid pressure chambers are isolated from fluid communication with one another.

38. The assembly of claim 32, including means for selectively adjusting the first biasing means to adjust a high pressure set point.

39. The assembly of claim 38, wherein the first biasing means comprises a spring and the adjusting means comprises a first adjustment screw coupled to the spring.

40. The assembly of claim 32, including a variable orifice assembly operably coupled to the pressure reducing valve and fluidly coupled to the pilot valve assembly and having a variable fluid flow between an inlet thereof and an outlet thereof.

41. The assembly of claim 40, including a variable orifice fluid flow stem coupled to the pressure reducing valve and slidably disposed between the fluid inlet and outlet of the variable orifice assembly, wherein the fluid flow through the inlet and outlet of the variable orifice assembly varies as the pressure reducing valve is opened and closed.

42. The assembly of claim 32, wherein the second diaphragm assembly includes a stem which extends into the first diaphragm assembly and slidably travels with respect thereto as the first diaphragm assembly and the second diaphragm assembly move relative to one another.

43. The assembly of claim 42, wherein the first diaphragm assembly includes first and second stops for limiting travel of the stem.

44. The assembly of claim 43, wherein the first and second stops move as the first diaphragm is moved.

45. The assembly of claim 44, including means for adjusting the first stop to adjust a low pressure set point.

46. The assembly of claim 45, wherein the adjusting means comprises a second adjustment screw.

47. A pilot valve assembly that controls a pressure reducing valve of a water supply system between high pressure and low pressure set points, the assembly comprising:
a body defining an interior cavity;
a first diaphragm assembly within the cavity and including a first diaphragm having a first surface thereof at least partially defining a first fluid pressure chamber in fluid communication with a fluid passageway formed in the body, and a first biasing means for biasing the first diaphragm; and
a second diaphragm assembly within the cavity and including a second diaphragm having a first surface thereof at least partially defining the first fluid pressure chamber, and a second surface thereof at least partially defining a second fluid pressure chamber in fluid communication with a fluid inlet and a fluid outlet formed in the body, and a gate disposed between the fluid inlet and the fluid outlet for controlling fluid flow through the second fluid pressure chamber, and a second biasing means for biasing the gate and the second diaphragm;
wherein fluid pressure at the outlet of the second chamber is substantially equal to outlet pressure of the pressure reducing valve;
wherein the second diaphragm assembly includes a stem which extends into the first diaphragm assembly and slidably travels with respect thereto as the first diaphragm assembly and the second diaphragm assembly move relative to one another; and
wherein the first diaphragm assembly includes first and second stops for limiting travel of the stem.

48. The assembly of claim 47, wherein when a fluid pressure in the first fluid pressure chamber is approximately equal to or less than a low pressure set point the gate is moved towards a closed position to restrict the flow of fluid through the second chamber, and when the fluid pressure in the first fluid pressure chamber is equal to or greater than a high pressure set point the gate is moved towards an open position to facilitate flow of fluid through the second chamber.

49. The assembly of claim 47, wherein the second biasing means comprises a spring biasing the gate towards a closed position.

50. The assembly of claim 47, wherein the ratio of the area of the first diaphragm to the second diaphragm is approximately 1:1.

51. The assembly of claim 47, wherein the inlet of the second fluid pressure chamber is fluidly coupled to a valve actuating pressure chamber of the pressure reducing valve.

52. The assembly of claim 47, including a fixed orifice between the inlet of the second fluid pressure chamber and the inlet of the pressure reducing valve.

53. The assembly of claim 47, wherein the first and second fluid pressure chambers are isolated from fluid communication with one another.

54. The assembly of claim 47, including means for selectively adjusting the first biasing means to adjust a high pressure set point.

55. The assembly of claim 54, wherein the first biasing means comprises a spring and the adjusting means comprises a first adjustment screw coupled to the spring.

56. The assembly of claim 47, wherein the first and second stops move as the first diaphragm is moved.

57. The assembly of claim 56, including means for adjusting the first stop to adjust a low pressure set point.

58. The assembly of claim 57, wherein the adjusting means comprises a second adjustment screw.

59. The assembly of claim 47, including a variable orifice assembly operably coupled to the pressure reducing valve and fluidly coupled to the pilot valve assembly and having a variable fluid flow between an inlet thereof and an outlet thereof.

60. The assembly of claim 59, including a variable orifice fluid flow stem coupled to the pressure reducing valve and slidably disposed between the fluid inlet and outlet of the variable orifice assembly, wherein the fluid flow through the inlet and outlet of the variable orifice assembly varies as the pressure reducing valve is opened and closed.

* * * * *